(12) United States Patent
Kessler

(10) Patent No.: US 12,164,456 B2
(45) Date of Patent: Dec. 10, 2024

(54) SYSTEMS AND TECHNIQUES FOR REMOTE BUS ENABLE

(71) Applicant: Analog Devices, Inc., Norwood, MA (US)

(72) Inventor: Martin Kessler, Salem, MA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

(21) Appl. No.: 15/684,522

(22) Filed: Aug. 23, 2017

(65) Prior Publication Data

US 2018/0060269 A1    Mar. 1, 2018

Related U.S. Application Data

(60) Provisional application No. 62/379,355, filed on Aug. 25, 2016.

(51) Int. Cl.
*G06F 13/42* (2006.01)
*G06F 13/40* (2006.01)

(52) U.S. Cl.
CPC ...... *G06F 13/4265* (2013.01); *G06F 13/4022* (2013.01); *Y02D 10/00* (2018.01)

(58) Field of Classification Search
None
See application file for complete search history.

(56) References Cited

U.S. PATENT DOCUMENTS

| | | | |
|---|---|---|---|
| 5,717,386 A | 2/1998 | Sakagami et al. | |
| 5,819,051 A | 10/1998 | Murray et al. | |
| 5,918,171 A * | 6/1999 | Funke | H04W 84/14 455/403 |
| 6,477,140 B1 | 11/2002 | Uda et al. | |
| 6,547,146 B1 * | 4/2003 | Meksavan | G06K 7/10702 235/462.49 |
| 7,158,596 B2 | 1/2007 | Knapp et al. | |
| 7,210,049 B2 | 4/2007 | Disser | |
| 7,272,202 B2 | 9/2007 | Knapp et al. | |
| 7,315,551 B2 | 1/2008 | Olson et al. | |

(Continued)

FOREIGN PATENT DOCUMENTS

| | | |
|---|---|---|
| CN | 104950775 | 9/2015 |
| EP | 3112980 | 1/2017 |

(Continued)

OTHER PUBLICATIONS

Application Note, AN1278, LIN (Local Interconnect Network) Solutions, by Microcontroller Division Applications 2002 ST Microelectronics, 44 pages. (Year: 2002).*

(Continued)

*Primary Examiner* — Henry Tsai
*Assistant Examiner* — Aurangzeb Hassan
(74) *Attorney, Agent, or Firm* — ARENTFOX SCHIFF LLP

(57) ABSTRACT

Disclosed herein are systems and techniques for remote bus enable. In some embodiments, a communication system with remote enable functionality may include: a master transceiver coupled to a downstream link of a bus; a voltage regulator, wherein the voltage regulator has a voltage output and an enable input, and the voltage output is coupled to the master transceiver; and a switch coupled to the enable input of the voltage regulator.

27 Claims, 27 Drawing Sheets

(56) References Cited

U.S. PATENT DOCUMENTS

| | | | |
|---|---|---|---|
| 7,333,785 B1* | 2/2008 | Lavelle | H04W 52/028 |
| | | | 455/127.5 |
| 7,395,362 B2 | 7/2008 | Drexler et al. | |
| 7,539,804 B2 | 5/2009 | Miura | |
| 7,685,449 B2 | 3/2010 | Terasawa | |
| 7,707,437 B2 | 4/2010 | Berenbaum et al. | |
| 7,802,036 B2 | 9/2010 | Takeuchi | |
| 7,966,379 B2 | 6/2011 | Berenbaum et al. | |
| 8,147,338 B2 | 4/2012 | Hutchison-Kay | |
| 8,156,274 B2 | 4/2012 | Kapelner | |
| 8,185,759 B1 | 5/2012 | Li et al. | |
| 8,351,174 B1* | 1/2013 | Gardner | H02H 3/243 |
| | | | 361/92 |
| 8,600,583 B2 | 12/2013 | Fervel et al. | |
| 8,615,091 B2 | 12/2013 | Terwal | |
| 8,667,194 B2 | 3/2014 | Dybsetter et al. | |
| 8,745,305 B2 | 6/2014 | Toba et al. | |
| 8,806,083 B2 | 8/2014 | Doorenbos | |
| 8,873,659 B2 | 10/2014 | Wang et al. | |
| 8,987,933 B2 | 3/2015 | Yu | |
| 9,811,619 B2* | 11/2017 | Atwell | G06F 30/36 |
| 9,887,710 B1* | 2/2018 | Lim | H02M 3/158 |
| 2002/0175820 A1* | 11/2002 | Oja | G08B 21/0227 |
| | | | 340/573.4 |
| 2004/0049616 A1 | 3/2004 | Dunstan et al. | |
| 2005/0217999 A1* | 10/2005 | You | C25B 15/06 |
| | | | 205/81 |
| 2007/0076452 A1* | 4/2007 | Schultz | H02J 3/1842 |
| | | | 363/72 |
| 2010/0045249 A1* | 2/2010 | Park | G11C 5/147 |
| | | | 323/282 |
| 2010/0245054 A1* | 9/2010 | Kim | H04B 5/0062 |
| | | | 455/41.1 |
| 2011/0291488 A1* | 12/2011 | Paik | G01R 15/183 |
| | | | 307/104 |
| 2012/0093342 A1 | 4/2012 | Rupprecht et al. | |
| 2012/0153992 A1* | 6/2012 | Nogawa | G06F 1/26 |
| | | | 327/76 |
| 2013/0033104 A1* | 2/2013 | Gunther | G05F 1/56 |
| | | | 307/31 |
| 2013/0070540 A1* | 3/2013 | Pyeon | G11C 11/4074 |
| | | | 365/189.07 |
| 2013/0124763 A1* | 5/2013 | Kessler | G06F 13/4295 |
| | | | 710/110 |
| 2013/0249290 A1* | 9/2013 | Buonpane | G06F 1/3209 |
| | | | 307/31 |
| 2014/0025999 A1 | 1/2014 | Kessler | |
| 2014/0062720 A1* | 3/2014 | Spruth | H04Q 9/00 |
| | | | 340/870.02 |
| 2014/0095750 A1 | 4/2014 | Tailliet | |
| 2014/0101351 A1 | 4/2014 | Hooper et al. | |
| 2014/0101477 A1 | 4/2014 | Patterson | |
| 2014/0223054 A1 | 8/2014 | Hasan et al. | |
| 2014/0281077 A1 | 9/2014 | Biskup | |
| 2014/0281078 A1 | 9/2014 | Biskup | |
| 2014/0281079 A1 | 9/2014 | Biskup | |
| 2014/0362865 A1 | 12/2014 | Chini et al. | |
| 2015/0008960 A1 | 1/2015 | Lahr | |
| 2015/0009050 A1 | 1/2015 | Lahr et al. | |
| 2015/0032599 A1 | 1/2015 | Agapitov | |
| 2015/0254206 A1 | 9/2015 | Biskup | |
| 2015/0270777 A1* | 9/2015 | Cowley | H01L 25/0657 |
| | | | 323/271 |
| 2015/0301968 A1 | 10/2015 | Kessler | |
| 2015/0313665 A1 | 11/2015 | Lech | |
| 2015/0365754 A1 | 12/2015 | Perl | |
| 2016/0034416 A1 | 2/2016 | Chavez et al. | |
| 2016/0034417 A1 | 2/2016 | Chavez et al. | |
| 2016/0041941 A1 | 2/2016 | Kessler et al. | |
| 2016/0196817 A1 | 7/2016 | Mortensen et al. | |
| 2016/0274614 A1* | 9/2016 | Tang | G05F 3/262 |
| 2017/0019025 A1* | 1/2017 | Yamkovoy | H02M 3/156 |
| 2017/0109305 A1 | 5/2017 | Liu et al. | |
| 2017/0220502 A1 | 8/2017 | Kessler et al. | |
| 2017/0222790 A1 | 8/2017 | Hooper et al. | |
| 2017/0222829 A1 | 8/2017 | Kessler | |
| 2018/0212538 A1* | 7/2018 | Lindberg | F04D 25/06 |

FOREIGN PATENT DOCUMENTS

| | | |
|---|---|---|
| JP | 2014534686 | 12/2014 |
| WO | WO 2013052886 | 4/2013 |

OTHER PUBLICATIONS

Thomas Schmidt, *Using the LIN Bus In Household Applications*, EET Asia, Published Mar. 3, 2003, http://archive.eetasia.com/www.eetasia.com/ART_8800300191_590626_TA_1fd7bb50.HTM, 2 pages.

*Introduction to the Local Interconnect Network (LIN) Bus*, Published Nov. 3, 2011, http://www.ni.com/white-paper/9733/en/, 6 pages.

Application Note, AN1278, *LIN (Local Interconnect Network) Solutions*, by Microcontroller Division Applications, © 2002 ST Microelectronics, 44 pages.

Unpublished U.S. Appl. No. 15/139,238, filed Apr. 26, 2016.

International Search Report and Written Opinion issued in International Patent Application Serial No. PCT/US2017/048210 mailed Dec. 20, 2017, 13 pages.

JP Office Action issued in JP2019-511349 mailed Feb. 10, 2020, 4 pages to include a Summary of Relevance.

\* cited by examiner

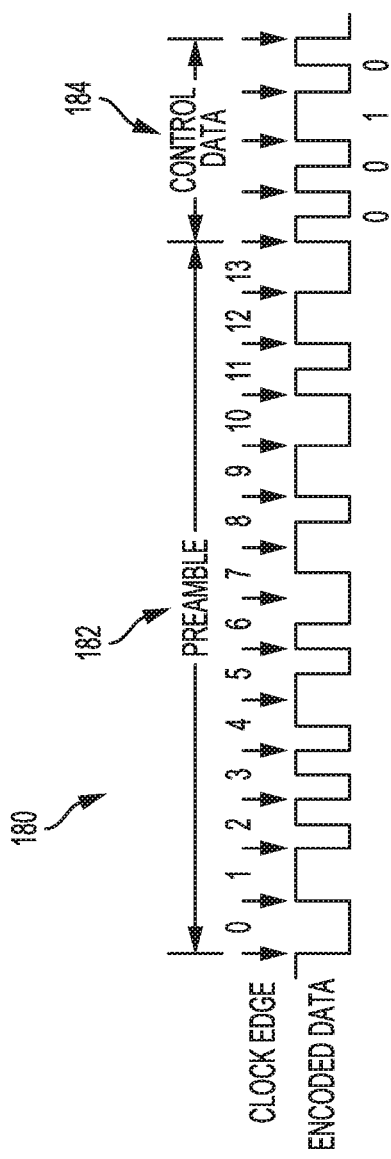
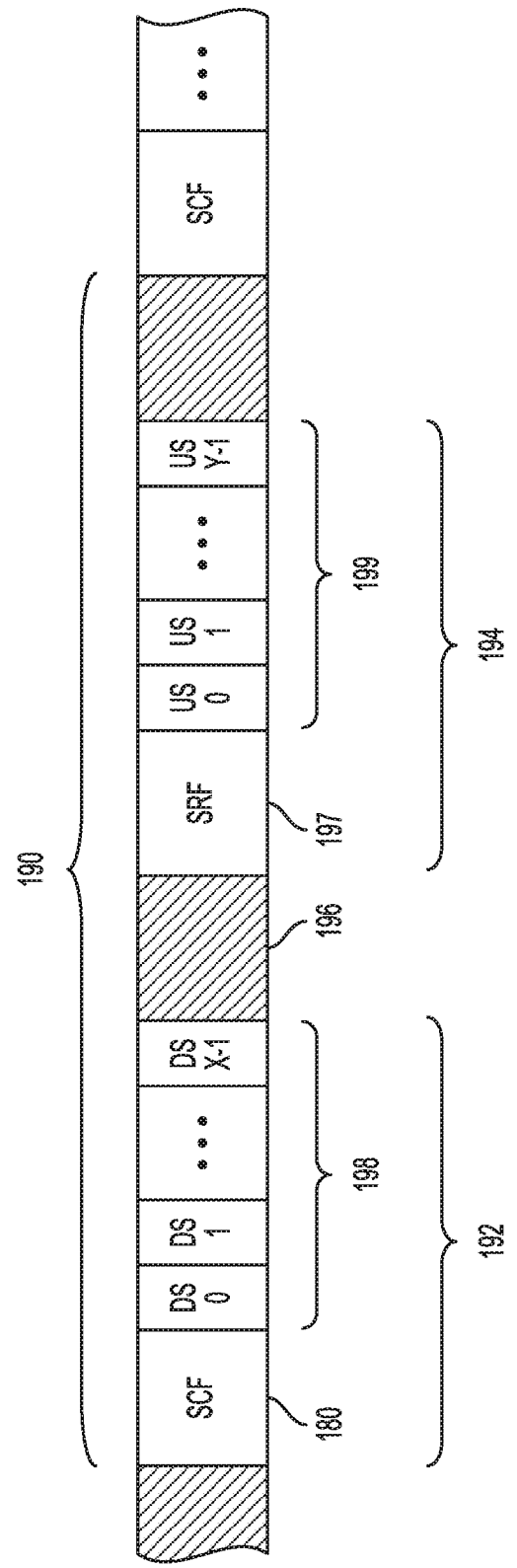
FIG. 3
FIG. 4

SYSTEMS AND TECHNIQUES FOR REMOTE BUS ENABLE

CROSS-REFERENCE TO RELATED APPLICATION

This application claims priority to U.S. Provisional Patent Application No. 62/379,355, filed Aug. 25, 2016 and titled "SYSTEMS AND TECHNIQUES FOR REMOTE BUS ENABLE." This priority application is incorporated by reference herein in its entirety.

BACKGROUND

As electronic components decrease in size, and as performance expectations increase, more components are included in previously un-instrumented or less-instrumented devices. In some settings, the communication infrastructure used to exchange signals between these components (e.g., in a vehicle) has required thick and heavy bundles of cables.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 3 is a diagram of a portion of a synchronization control frame used for communication in the system of FIG. 1, in accordance with various embodiments.

FIG. 4 is a diagram of a superframe used for communication in the system of FIG. 1, in accordance with various embodiments.

DETAILED DESCRIPTION

Figure 1:
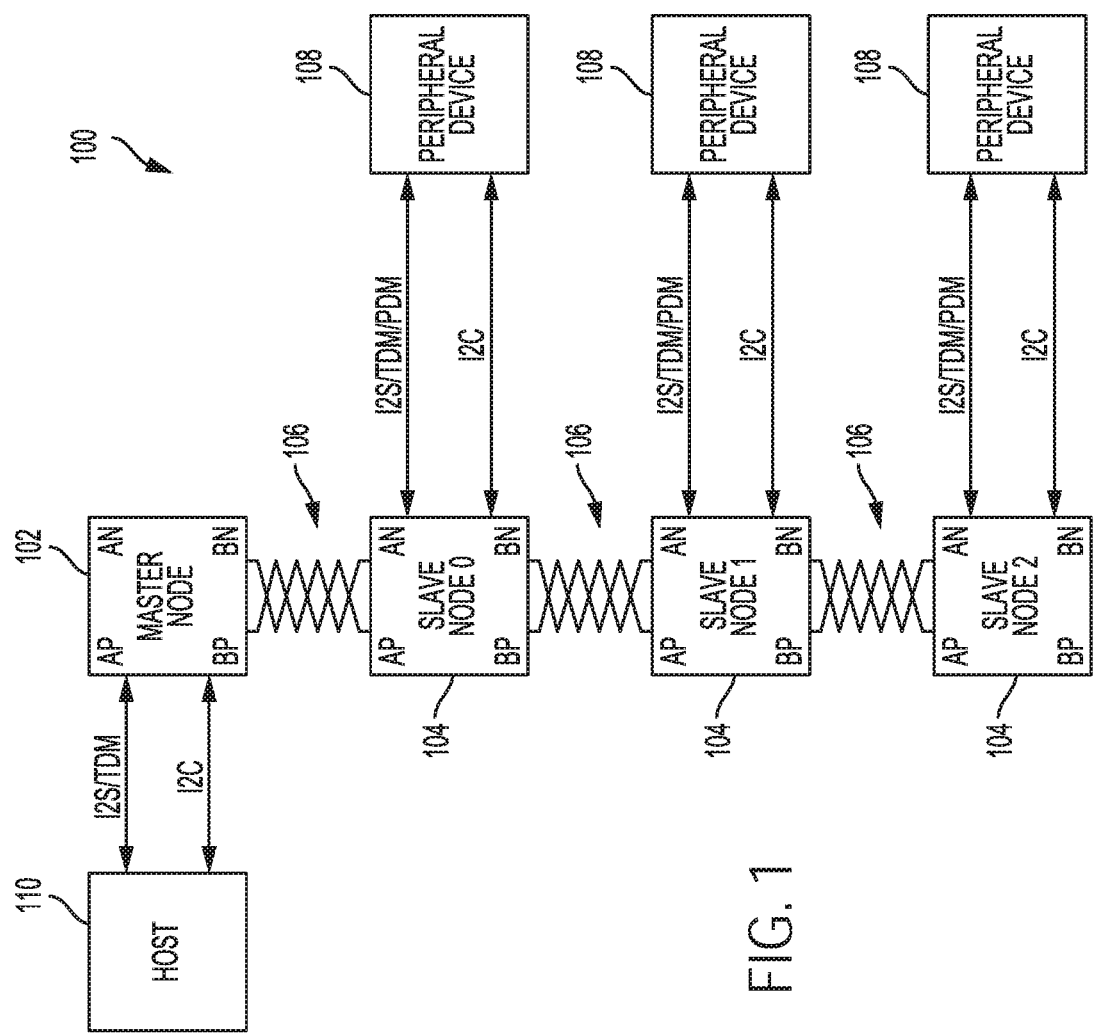
FIG. 1 is a block diagram of an illustrative two-wire communication system, in accordance with various embodiments.

Disclosed herein are systems and techniques for remote bus enable. In some embodiments, a communication system with remote enable functionality may include: a master transceiver coupled to a downstream segment of a bus; a voltage regulator, wherein the voltage regulator has a voltage output and an enable input, and the voltage output is coupled to the master transceiver; and a switch coupled to the enable input of the voltage regulator.

As used herein, "remote bus enable" may refer to using a non-master device on a bus to enable communications over the bus. For example, when a master device on a bus is in a power-off, low-power, sleep, or other standby mode (and thus normal communications over the bus is disabled), the remote bus enable systems and techniques disclosed herein may allow a non-master device (e.g., a slave device, or another device along the bus, such as a switch) to "wake up" the master device and thereby enable communications on the bus. Upon wake up, the master device may perform its discovery and initialization protocols, after which the bus may be used as a high-speed communication link. Various ones of the systems and techniques disclosed herein may thus enable power savings (e.g., by allowing the master device to bring the entire communication system into a low power mode when active communications are not needed) and a flexible and fast return to full communications (e.g., by allowing a slave or other device on the bus to wake up the master). Various ones of the systems and techniques disclosed herein for remote bus enable may themselves be relatively low power, in the sense that they do not require ordinary bus communication in order to wake up the master device; instead, other mechanisms, using less power than ordinary bus communication, may be used to initiate the wake-up of the master device.

In some conventional communication systems, a communication bus may only be enabled by a command issued from the master device; when the master device is asleep or otherwise in a low-power mode, it must be directly powered up before communications can be restored. This kind of direct power up may require extra wires, or potentially an entirely separate bus system that remains perpetually "on" (and thus perpetually consumes power).

Any of the embodiments disclosed herein may be used in any suitable setting. In some embodiments, as discussed below, the communication systems disclosed herein may be used in a vehicle, and the remote bus enable techniques may be used to allow a non-master component in a vehicle to activate the communication system when it is in a sleep or other quiescent mode. For example, pressing a roadside assistance or emergency call button in a vehicle (e.g., on the rearview mirror) may trigger the wake-up of a master device in a communication bus to which the button is coupled (e.g., as a slave device, or in another manner, as described below). In another example, a microphone coupled to a communication bus may trigger the wake-up of a master device when speech commands are recognized or when an elevated noise level is detected.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Various components may be referred to or illustrated herein in the singular (e.g., a "processor," a "peripheral device," etc.), but this is simply for ease of discussion, and any element referred to in the singular may include multiple such elements in accordance with the teachings herein.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. As used herein, the term "circuitry" may refer to, be part of, or include an application-specific integrated circuit (ASIC), an electronic circuit, and optical circuit, a processor (shared, dedicated, or group), and/or memory (shared, dedicated, or group) that execute one or more software or firmware programs, a combinational logic circuit, and/or other suitable hardware that provide the described functionality. A master node may also be referred to as a master "device" herein; similarly, a slave node may be referred to as a slave "device" herein.

FIG. 1 is a block diagram of an illustrative half-duplex two-wire communication system 100, in accordance with various embodiments. The system 100 includes a host 110, a master node 102 and at least one slave node 104. In FIG. 1, three slave nodes (0, 1, and 2) are illustrated. The depiction of three slave nodes 104 in FIG. 1 is simply illustrative, and the system 100 may include one, two, or more slave nodes 104, as desired.

The master node 102 may communicate with the slave nodes 104 over a two-wire bus 106. The bus 106 may include different two-wire bus links between adjacent nodes along the bus 106 to connect the nodes along the bus 106 in a daisy-chain fashion. For example, as illustrated in FIG. 1, the bus 106 may include a link coupling the master node 102 to the slave node 0, a link coupling the slave node 0 to the slave node 1, and a link coupling the slave node 1 to the slave node 2. In some embodiments, the links of the bus 106 may each be formed of a single twisted wire pair (e.g., an unshielded twisted pair). In some embodiments, the links of the bus 106 may each be formed of a coax cable (e.g., with the core providing the "positive" line and the shield providing the "negative" line, or vice versa).

The host 110 may include a processor that programs the master node 102, and acts as the originator and recipient of various payloads transmitted along the bus 106. In some embodiments, the host 110 may be or may include a microcontroller, for example. In particular, the host 110 may be the master of Inter-Integrated Circuit Sound (I2S) communications that happen along the bus 106. The host 110 may communicate with the master node 102 via an I2S/Time Division Multiplex (TDM) bus and/or an Inter-Integrated Circuit (I2C) bus. In some embodiments, the master node 102 may be a transceiver (e.g., the node transceiver 120 discussed below with reference to FIG. 2) located within a housing of the host 110. The master node 102 may be programmable by the host 110 over the I2C bus for configuration and read-back, and may be configured to generate clock, synchronization, and framing for all of the slave nodes 104. In some embodiments, an extension of the I2C control bus between the host 110 in the master node 102 may be embedded in the data streams transmitted over the bus 106, allowing the host 110 direct access to registers and status information for the one or more slave nodes 104, as well as enabling I2C-to-I2C communication over distance to allow the host 110 to control the peripherals 108.

The master node 102 may generate "downstream" signals (e.g., data signals, power signals, etc., transmitted away from the master node 102 along the bus 106) and receive "upstream" signals (e.g., transmitted toward the master node 102 along the bus 106). The master node 102 may provide a clock signal for synchronous data transmission over the bus 106. As used herein, "synchronous data" may include data streamed continuously (e.g., audio signals) with a fixed time interval between two successive transmissions to/from the same node along the bus 106. In some embodiments, the clock signal provided by the master node 102 may be derived from an I2S input provided to the master node 102 by the host 110. A slave node 104 may be an addressable network connection point that represents a possible destination for data frames transmitted downstream on the bus 106 or upstream on the bus 106. A slave node 104 may also represent a possible source of downstream or upstream data frames. The system 100 may allow for control information and other data to be transmitted in both directions over the bus 106 from one node to the next. One or more of the slave nodes 104 may also be powered by signals transmitted over the bus 106.

In particular, each of the master node 102 and the slave nodes 104 may include a positive upstream terminal (denoted as "AP"), a negative upstream terminal (denoted as "AN"), a positive downstream terminal (denoted as "BP"), and a negative downstream terminal (denoted as "BN"). The positive and negative downstream terminals of a node may be coupled to the positive and negative upstream terminals of the adjacent downstream node, respectively. As shown in FIG. 1, the master node 102 may include positive and negative upstream terminals, but these terminals may not be used; in other embodiments, the master node 102 may not include positive and negative upstream terminals. The last slave node 104 along the bus 106 (the slave node 2 in FIG. 1) may include positive and negative downstream terminals, but these terminals may not be used; in other embodiments, the last slave node 104 along the bus may not include positive and negative downstream terminals.

As discussed in detail below, the master node 102 may periodically send a synchronization control frame downstream, optionally along with data intended for one or more of the slave nodes 104. For example, the master node 102 may transmit a synchronization control frame every 1024 bits (representing a superframe) at a frequency of 48 kHz, resulting in an effective bit rate on the bus 106 of 49.152 Mbps. Other rates may be supported, including, for example, 44.1 kHz. The synchronization control frame may allow the slave nodes 104 to identify the beginning of each superframe and also, in combination with physical layer encoding/signaling, may allow each slave node 104 to derive its internal operational clock from the bus 106. The synchronization control frame may include a preamble for signaling the start of synchronization, as well as control fields that allow for various addressing modes (e.g., normal, broadcast, discovery), configuration information (e.g., writing to registers of the slave nodes 104), conveyance of I2C information, remote control of certain general-purpose input/output (GPIO) pins at the slave nodes 104, and other services. A portion of the synchronization control frame following the preamble and the payload data may be scrambled in order to reduce the likelihood that information in the synchronization control frame will be mistaken for a new preamble, and to flatten the spectrum of related electromagnetic emissions.

The synchronization control frame may get passed between slave node 104 (optionally along with other data, which may come from the master node 102 but additionally or alternatively may come from one or more upstream slave nodes 104 or from a slave node 104 itself) until it reaches the last slave node 104 (i.e., the slave node 2 in FIG. 1), which has been configured by the master node 102 as the last slave node 104 or has self-identified itself as the last slave node 104. Upon receiving the synchronization control frame, the last slave node 104 may transmit a synchronization response frame followed by any data that it is permitted to transmit (e.g., a 24-bit audio sample in a designated time slot). The synchronization response frame may be passed upstream between slave nodes 104 (optionally along with data from downstream slave nodes 104), and based on the synchronization response frame, each slave node 104 may be able to identify a time slot, if any, in which the slave node 104 is permitted to transmit.

In some embodiments, one or more of the slave nodes 104 in the system 100 may be coupled to and communicate with a peripheral device 108. For example, a slave node 104 may be configured to read data from and/or write data to the associated peripheral device 108 using I2S, pulse density modulation (PDM), TDM, and/or I2C protocols, as discussed below. Although the "peripheral device 108" may be referred to in the singular herein, this is simply for ease of discussion, and a single slave node 104 may be coupled with zero, one, or more peripheral devices. Examples of peripheral devices that may be included in the peripheral device 108 may include a digital signal processor (DSP), a field programmable gate array (FPGA), an application-specific integrated circuit (ASIC), an analog to digital converter (ADC), a digital to analog converter (DAC), a codec, a microphone, a microphone array, a speaker, an audio amplifier, a protocol analyzer, an accelerometer or other motion sensor, an environmental condition sensor (e.g., a temperature, humidity, and/or gas sensor), a wired or wireless communication transceiver, a display device (e.g., a touchscreen display), a user interface component (e.g., a button, a dial, or other control), a camera (e.g., a video camera), a memory device, or any other suitable device that transmits and/or receives data. A number of examples of different peripheral device configurations are discussed in detail herein.

In some embodiments, the peripheral device 108 may include any device configured for Inter-Integrated Circuit Sound (I2S) communication; the peripheral device 108 may communicate with the associated slave node 104 via the I2S protocol. In some embodiments, the peripheral device 108 may include any device configured for Inter-Integrated Circuit (I2C) communication; the peripheral device 108 may communicate with the associated slave node 104 via the I2C protocol. In some embodiments, a slave node 104 may not be coupled to any peripheral device 108.

A slave node 104 and its associated peripheral device 108 may be contained in separate housings and coupled through a wired or wireless communication connection or may be contained in a common housing. For example, a speaker connected as a peripheral device 108 may be packaged with the hardware for an associated slave node 104 (e.g., the node transceiver 120 discussed below with reference to FIG. 2), such that the hardware for the associated slave node 104 is contained within a housing that includes other speaker components. The same may be true for any type of peripheral device 108.

As discussed above, the host 110 may communicate with and control the master node 102 using multi-channel I2S and I2C communication protocols. In particular, the host 110 may transmit data via I2S to a frame buffer (not illustrated) in the master node 102, and the master node 102 may read data from the frame buffer and transmit the data along the bus 106. Analogously, the master node 102 may store data received via the bus 106 in the frame buffer, and then may transmit the data to the host 110 via I2S.

Each slave node 104 may have internal control registers that may be configured by communications from the master node 102. A number of such registers are discussed in detail below. Each slave node 104 may receive downstream data and may retransmit the data further downstream. Each slave node 104 may receive and/or generate upstream data and/or retransmit data upstream and/or add data to and upstream transaction.

Communications along the bus 106 may occur in periodic superframes. Each superframe may begin with a downstream synchronization control frame; be divided into periods of downstream transmission (also called "downstream portions"), upstream transmission (also called "upstream portions"), and no transmission (where the bus 106 is not driven); and end just prior to transmission of another downstream synchronization control frame. The master node 102 may be programmed (by the host 110) with a number of downstream portions to transmit to one or more of the slave nodes 104 and a number of upstream portions to receive from one or more of the slave nodes 104. Each slave node 104 may be programmed (by the master node 102) with a number of downstream portions to retransmit down the bus 106, a number of downstream portions to consume, a number of upstream portions to retransmit up the bus 106, and a number of upstream portions in which the slave node 104 may transmit data received from the slave node 104 from the associated peripheral device 108. Communication along the bus 106 is discussed in further detail below with reference to FIGS. 2-12.

Figure 2:
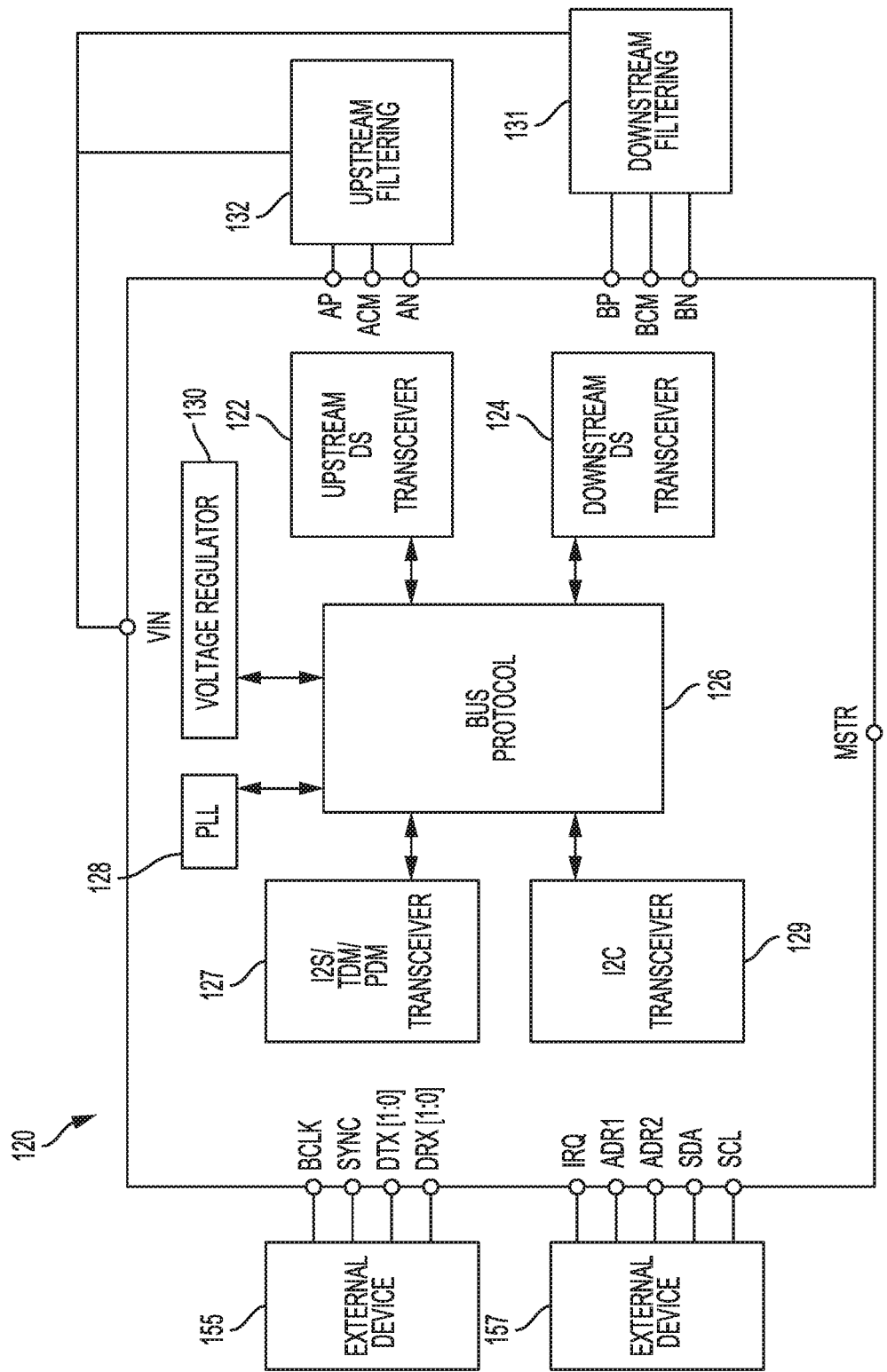
FIG. 2 is a block diagram of a node transceiver that may be included in a node of the system of FIG. 1, in accordance with various embodiments.

Each of the master node 102 and the slave nodes 104 may include a transceiver to manage communication between components of the system 100. FIG. 2 is a block diagram of a node transceiver 120 that may be included in a node (e.g., the master node 102 or a slave node 104) of the system 100 of FIG. 1, in accordance with various embodiments. In some embodiments, a node transceiver 120 may be included in each of the nodes of the system 100, and a control signal may be provided to the node transceiver 120 via a master (MSTR) pin to indicate whether the node transceiver 120 is to act as a master (e.g., when the MSTR pin is high) or a slave (e.g., when the MSTR pin is low).

The node transceiver 120 may include an upstream differential signaling (DS) transceiver 122 and a downstream DS transceiver 124. The upstream DS transceiver 122 may be coupled to the positive and negative upstream terminals discussed above with reference to FIG. 1, and the downstream DS transceiver 124 may be coupled to the positive and negative downstream terminals discussed above with reference to FIG. 1. In some embodiments, the upstream DS transceiver 122 may be a low voltage DS (LVDS) transceiver, and the downstream DS transceiver 124 may be an LVDS transceiver. Each node in the system 100 may be AC-coupled to the bus 106, and data signals may be conveyed along the bus 106 (e.g., via the upstream DS transceiver 122 and/or the downstream DS transceiver 124) using a predetermined form of DS (e.g., LVDS or Multipoint LVDS (MLVDS) or similar signaling) with appropriate encoding to provide timing information over the bus 106 (e.g., differential Manchester coding, biphase mark coding, Manchester coding, Non-Return-to-Zero, Inverted (NRZI) coding with run-length limiting, or any other suitable encoding).

The upstream DS transceiver 122 and the downstream DS transceiver 124 may communicate with bus protocol circuitry 126, and the bus protocol circuitry 126 may communicate with a phased locked loop (PLL) 128 and voltage regulator circuitry 130, among other components. When the node transceiver 120 is powered up, the voltage regulator circuitry 130 may raise a "power good" signal that is used by the PLL 128 as a power-on reset.

As noted above, one or more of the slave nodes 104 in the system 100 may receive power transmitted over the bus 106 concurrently with data. This mode of operation may be referred to herein as "phantom power." For power distribution (which is optional, as some of the slave nodes 104 may be configured to have exclusively local power provided to them), the master node 102 may place a DC bias on the bus link between the master node 102 and the slave node 0 (e.g., by connecting one of the downstream terminals to a voltage source provided by a voltage regulator and the other downstream terminal to ground). The DC bias may be a predetermined voltage, such as 5 V, 8 V, the voltage of a car battery, or a higher voltage. Each successive slave node 104 can selectively tap its upstream bus link to recover power (e.g., using the voltage regulator circuitry 130). This power may be used to power the slave node 104 itself (and optionally one or more peripheral device 108 coupled to the slave node 104). A slave node 104 may also selectively bias the bus link downstream for the next-in-line slave node 104 with either the recovered power from the upstream bus link or from a local power supply. For example, the slave node 0 may use the DC bias on the upstream bus link 106 to recover power for the slave node 0 itself and/or for one or more associated peripheral device 108, and/or the slave node 0 may recover power from its upstream bus link 106 to bias its downstream bus link 106.

Thus, in some embodiments, each node in the system 100 may provide power to the following downstream node over a downstream bus link. The powering of nodes may be performed in a sequenced manner. For example, after discovering and configuring the slave node 0 via the bus 106, the master node 102 may instruct the slave node 0 to provide power to its downstream bus link 106 in order to provide power to the slave node 1; after the slave node 1 is discovered and configured, the master node 102 may instruct the slave node 1 to provide power to its downstream bus link 106 in order to provide power to the slave node 2 (and so on for additional slave nodes 104 coupled to the bus 106. In some embodiments, one or more of the slave nodes 104 may be locally powered, instead of or in addition to being powered from its upstream bus link. In some such embodiments, the local power source for a given slave node 104 may be used to provide power to one or more downstream slave nodes.

In some embodiments, upstream filtering circuitry 132 may be disposed between the upstream DS transceiver 122 and the voltage regulator circuitry 130, and downstream filtering circuitry 131 may be disposed between the downstream DS transceiver 124 and the voltage regulator circuitry 130. Since each link of the bus 106 may carry AC (signal) and DC (power) components, the upstream filtering circuitry 132 and the downstream filtering circuitry 131 may separate the AC and DC components, providing the AC components to the upstream DS transceiver 122 and the downstream DS transceiver 124, and providing the DC components to the voltage regulator 130. AC couplings on the line side of the upstream DS transceiver 122 and downstream DS transceiver 124 substantially isolate the transceivers 122 and 124 from the DC component on the line to allow for high-speed bi-directional communications. As discussed above, the DC component may be tapped for power, and the upstream filtering circuitry 132 and the downstream filtering circuitry 131 may include a ferrite, a common mode choke, or an inductor, for example, to reduce the AC component provided to the voltage regulator circuitry 130. In some embodiments, the upstream filtering circuitry 132 may be included in the upstream DS transceiver 122, and/or the downstream filtering circuitry 131 may be included in the downstream DS transceiver 124; in other embodiments, the filtering circuitry may be external to the transceivers 122 and 124.

The node transceiver 120 may include a transceiver 127 for I2S, TDM, and PDM communication between the node transceiver 120 and an external device 155. Although the "external device 155" may be referred to in the singular herein, this is simply for ease of illustration, and multiple external devices may communicate with the node transceiver 120 via the I2S/TDM/PDM transceiver 127. As known in the art, the I2S protocol is for carrying pulse code modulated (PCM) information (e.g., between audio chips on a printed circuit board (PCB)). As used herein, "I2S/TDM" may refer to an extension of the I2S stereo (2-channel) content to multiple channels using TDM. As known in the art, PDM may be used in sigma delta converters, and in particular, PDM format may represent an over-sampled 1-bit sigma delta ADC signal before decimation. PDM format is often used as the output format for digital microphones. The I2S/TDM/PDM transceiver 127 may be in communication with the bus protocol circuitry 126 and pins for communication with the external device 155. Six pins, BCLK, SYNC, DTX[1:0], and DRX[1:0], are illustrated in FIG. 2; the BCLK pin may be used for an I2S bit clock, the SYNC pin may be used for an I2S frame synchronization signal, and the DTX[1:0] and DRX[1:0] pins are used for transmit and receive data channels, respectively. Although two transmit pins (DTX[1:0]) and two receive pins (DRX[1:0]) are illustrated in FIG. 2, any desired number of receive and/or transmit pins may be used.

When the node transceiver 120 is included in the master node 102, the external device 155 may include the host 110, and the I2S/TDM/PDM transceiver 127 may provide an I2S slave (in regards to BCLK and SYNC) that can receive data from the host 110 and send data to the host 110 synchronously with an I2S interface clock of the host 110. In particular, an I2S frame synchronization signal may be received at the SYNC pin as an input from the host 110, and the PLL 128 may use that signal to generate clocks. When the node transceiver 120 is included in a slave node 104, the external device 155 may include one or more peripheral devices 108, and the I2S/TDM/PDM transceiver 127 may provide an I2S clock master (for BCLK and SYNC) that can control I2S communication with the peripheral device 108. In particular, the I2S/TDM/PDM transceiver 127 may provide an I2S frame synchronization signal at the SYNC pin as an output. Registers in the node transceiver 120 may determine which and how many I2S/TDM channels are being transmitted as data slots over the bus 106. A TDM mode (TDM MODE) register in the node transceiver 120 may store a value of how many TDM channels fit between consecutive SYNC pulses on a TDM transmit or receive pin. Together with knowledge of the channel size, the node transceiver 120 may automatically set the BCLK rate to match the amount of bits within the sampling time (e.g., 48 kHz).

The node transceiver 120 may include a transceiver 129 for I2C communication between the node transceiver 120 and an external device 157. Although the "external device 157" may be referred to in the singular herein, this is simply for ease of illustration, and multiple external devices may communicate with the node transceiver 120 via the I2C transceiver 129. As known in the art, the I2C protocol uses clock (SCL) and data (SDA) lines to provide data transfer. The I2C transceiver 129 may be in communication with the bus protocol circuitry 126 and pins for communication with the external device 157. Four pins, ADR1, ADR2, SDA, and SCL are illustrated in FIG. 2; ADR1 and ADR2 may be used to modify the I2C addresses used by the node transceiver 120 when the node transceiver 120 acts as an I2C slave (e.g., when it is included in the master node 102), and SDA and SCL are used for the I2C serial data and serial clock signals, respectively. When the node transceiver 120 is included in the master node 102, the external device 157 may include the host 110, and the I2C transceiver 129 may provide an I2C slave that can receive programming instructions from the host 110. In particular, an I2C serial clock signal may be received at the SCL pin as an input from the host 110 for register accesses. When the node transceiver 120 is included in a slave node 104, the external device 157 may include a peripheral device 108 and the I2C transceiver 129 may provide an I2C master to allow the I2C transceiver to program one or more peripheral devices in accordance with instructions provided by the host 110 and transmitted to the node transceiver 120 via the bus 106. In particular, the I2C transceiver 129 may provide the I2C serial clock signal at the SCL pin as an output.

The node transceiver 120 may include an interrupt request (IRQ) pin in communication with the bus protocol circuitry 126. When the node transceiver 120 is included in the master node 102 via the I2C transceiver 129, the bus protocol circuitry 126 may provide event-driven interrupt requests toward the host 110 via the IRQ pin. When the node transceiver 120 is included in a slave node 104 (e.g., when the MSTR pin is low), the IRQ pin may serve as a GPIO pin with interrupt request capability. The node transceiver 120 may include other pins in addition to those shown in FIG. 2 (e.g., the SENSE and VSSN pins discussed below with reference to FIGS. 14-28).

The system 100 may operate in any of a number of different operational modes. The nodes on the bus 106 may each have a register indicating which operational mode is currently enabled. Descriptions follow of examples of various operational modes that may be implemented. In a standby operational mode, bus activity is reduced to enable global power savings; the only traffic required is a minimal downstream preamble to keep the Pas of each node (e.g., the PLL 128) synchronized. In standby operational mode, reads and writes across the bus 106 are not supported. In a discovery operational mode, the master node 102 may send predetermined signals out along the bus 106 and wait for suitable responses to map out the topology of slave nodes 104 distributed along the bus 106. In a normal operational mode, full register access may be available to and from the slave nodes 104 as well as access to and from peripheral devices 108 over the bus 106. Normal mode may be globally configured by the host 110 with or without synchronous upstream data and with or without synchronous downstream data.

FIG. 3 is a diagram of a portion of a synchronization control frame 180 used for communication in the system 100, in accordance with various embodiments. In particular, the synchronization control frame 180 may be used for data clock recovery and PLL synchronization, as discussed below. As noted above, because communications over the bus 106 may occur in both directions, communications may be time-multiplexed into downstream portions and upstream portions. In a downstream portion, a synchronization control frame and downstream data may be transmitted from the master node 102, while in an upstream portion, a synchronization response frame, and upstream data may be transmitted to the master node 102 from each of the slave nodes 104. The synchronization control frame 180 may include a preamble 182 and control data 184. Each slave node 104 may be configured to use the preamble 182 of the received synchronization control frame 180 as a time base for feeding the PLL 128. To facilitate this, a preamble 182 does not follow the "rules" of valid control data 184, and thus can be readily distinguished from the control data 184.

Figure 5:
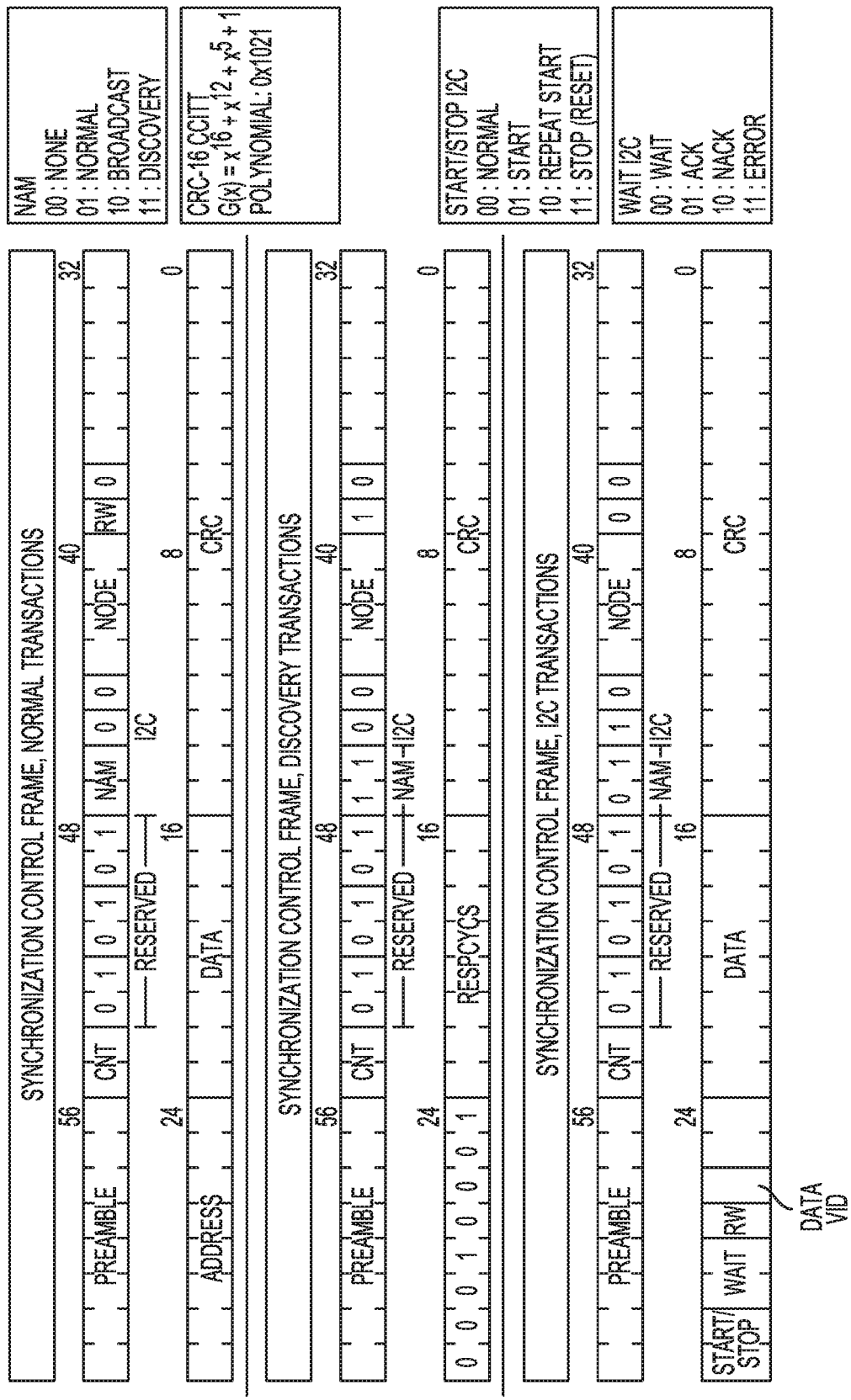
FIG. 5 illustrates example formats for a synchronization control frame in different modes of operation of the system of FIG. 1, in accordance with various embodiments.

For example, in some embodiments, communication along the bus 106 may be encoded using a clock first, transition on zero differential Manchester coding scheme. According to such an encoding scheme, each bit time begins with a clock transition. If the data value is zero, the encoded signal transitions again in the middle of the bit time. If the data value is one, the encoded signal does not transition again. The preamble 182 illustrated in FIG. 5 may violate the encoding protocol (e.g., by having clock transitions that do not occur at the beginning of bit times 5, 7, and 8), which means that the preamble 182 may not match any legal (e.g., correctly encoded) pattern for the control data 184. In addition, the preamble 182 cannot be reproduced by taking a legal pattern for the control data 184 and forcing the bus 106 high or low for a single bit time or for a multiple bit time period. The preamble 182 illustrated in FIG. 5 is simply illustrative, and the synchronization control frame 180 may include different preambles 182 that may violate the encoding used by the control data 184 in any suitable manner.

The bus protocol circuitry 126 may include differential Manchester decoder circuitry that runs on a clock recovered from the bus 106 and that detects the synchronization control frame 180 to send a frame sync indicator to the PLL 128. In this manner, the synchronization control frame 180 may be detected without using a system clock or a higher-speed oversampling clock. Consequently, the slave nodes 104 can receive a PLL synchronization signal from the bus 106 without requiring a crystal clock source at the slave nodes 104.

Figure 6:
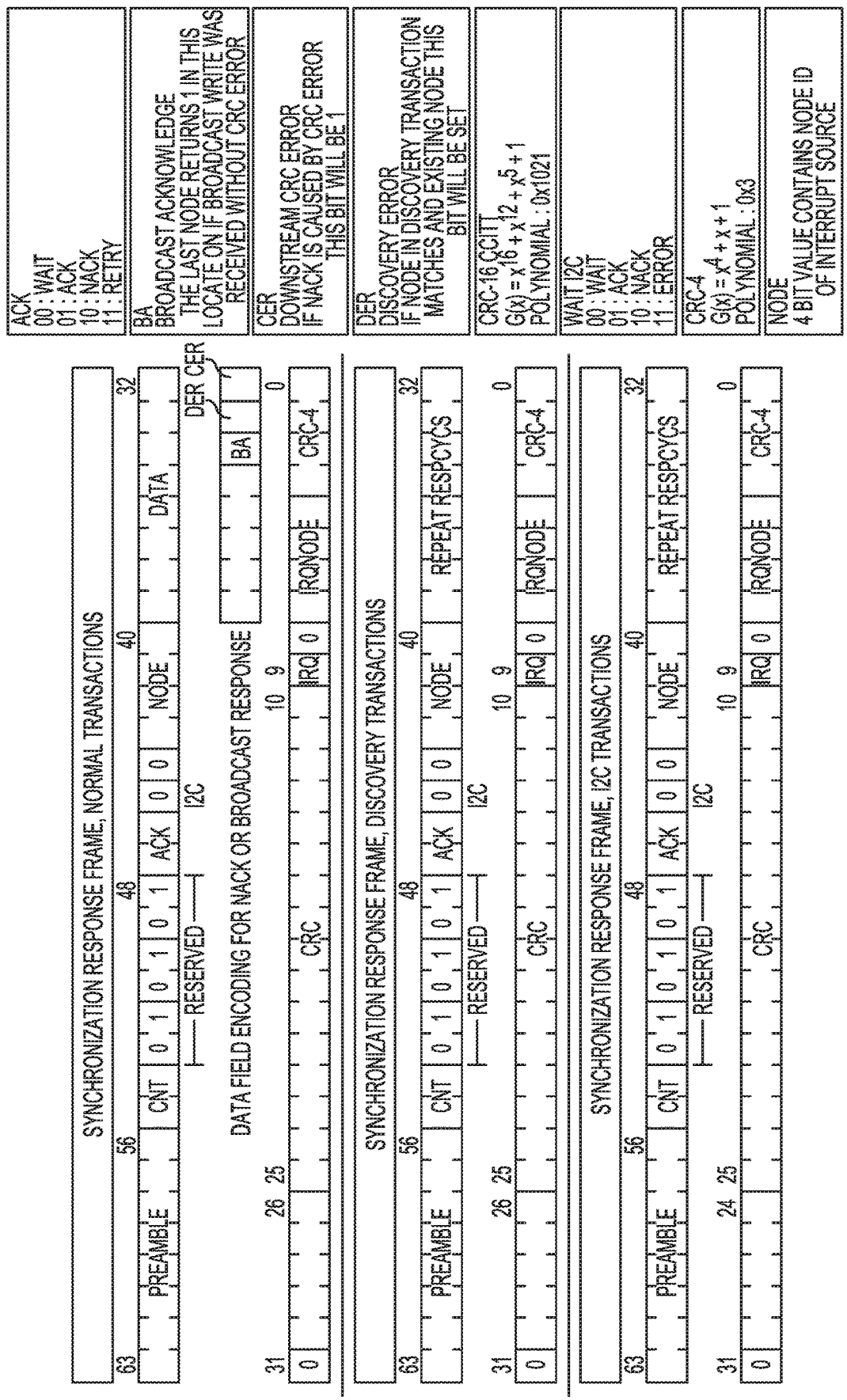
FIG. 6 illustrates example formats for a synchronization response frame at different modes of operation of the system of FIG. 1, in accordance with various embodiments.

As noted above, communications along the bus 106 may occur in periodic superframes. FIG. 4 is a diagram of a superframe 190, in accordance with various embodiments. As shown in FIG. 6, a superframe may begin with a synchronization control frame 180. When the synchronization control frame 180 is used as a timing source for the PLL 128, the frequency at which superframes are communicated ("the superframe frequency") may be the same as the synchronization signal frequency. In some embodiments in which audio data is transmitted along the bus 106, the superframe frequency may be the same as the audio sampling frequency used in the system 100 (e.g., either 48 kHz or 44.1 kHz), but any suitable superframe frequency may be used. Each superframe 190 may be divided into periods of downstream transmission 192, periods of upstream transmission 194, and periods of no transmission 196 (e.g., when the bus 106 is not driven).

In FIG. 4, the superframe 190 is shown with an initial period of downstream transmission 192 and a later period of upstream transmission 194. The period of downstream transmission 192 may include a synchronization control frame 180 and X downstream data slots 198, where X can be zero. Substantially all signals on the bus 106 may be line-coded and a synchronization signal forwarded downstream from the master node 102 to the last slave node 104 (e.g., the slave node 104C) in the form of the synchronization preamble 182 in the synchronization control frame 180, as discussed above. Downstream, TDM, synchronous data may be included in the X downstream data slots 198 after the synchronization control frame 180. The downstream data slots 198 may have equal width. As discussed above, the PLL 128 may provide the clock that a node uses to time communications over the bus 106. In some embodiments in which the bus 106 is used to transmit audio data, the PLL 128 may operate at a multiple of the audio sampling frequency (e.g., 1024 times the audio sampling frequency, resulting in 1024-bit clocks in each superframe).

The period of upstream transmission 194 may include a synchronization response frame 197 and Y upstream data slots 199, where Y can be zero. In some embodiments, each slave node 104 may consume a portion of the downstream data slots 198. The last slave node (e.g., slave node 2 in FIG. 1) may respond (after a predetermined response time stored in a register of the last slave node) with a synchronization response frame 197. Upstream, TDM, synchronous data may be added by each slave node 104 in the upstream data slots 199 directly after the synchronization response frame 197. The upstream data slots 199 may have equal width. A slave node 104 that is not the last slave node (e.g., the slave nodes 0 and 1 in FIG. 1) may replace the received synchronization response frame 197 with its own upstream response if a read of one of its registers was requested in the synchronization control frame 180 of the superframe 190 or if a remote I2C read was requested in the synchronization control frame 180 of the superframe 190.

As discussed above, the synchronization control frame 180 may begin each downstream transmission. In some embodiments, the synchronization control frame 180 may be 64 bits in length, but any other suitable length may be used. The synchronization control frame 180 may begin with the preamble 182, as noted above. In some embodiments, when the synchronization control frame 180 is retransmitted by a slave node 104 to a downstream slave node 104, the preamble 182 may be generated by the transmitting slave node 104, rather than being retransmitted.

The control data 184 of the synchronization control frame 180 may include fields that contain data used to control transactions over the bus 106. Examples of these fields are discussed below, and some embodiments are illustrated in FIG. 5. In particular, FIG. 5 illustrates example formats for the synchronization control frame 180 in normal mode, I2C mode, and discovery mode, in accordance with various embodiments. In some embodiments, a different preamble 182 or synchronization control frame 180 entirely may be used in standby mode so that the slave nodes 104 do not need to receive all of the synchronization control frame 180 until a transition to normal mode is sent.

In some embodiments, the synchronization control frame 180 may include a count (CNT) field. The CNT field may have any suitable length (e.g., 2 bits) and may be incremented (modulo the length of the field) from the value used in the previous superframe. A slave node 104 that receives a CNT value that is unexpected may be programmed to return an interrupt.

In some embodiments, the synchronization control frame 180 may include a node addressing mode (NAM) field. The NAM field may have any suitable length (e.g., 2 bits) and may be used to control access to registers of a slave node 104 over the bus 106. In normal mode, registers of a slave node 104 may be read from and/or written to based on the ID of the slave node 104 and the address of the register. Broadcast transactions are writes which should be taken by every slave node 104. In some embodiments, the NAM field may provide for four node addressing modes, including "none" (e.g., data not addressed to any particular slave node 104), "normal" (e.g., data unicast to a specific slave node 104 specified in the address field discussed below), "broadcast" (e.g., addressed to all slave nodes 104), and "discovery."

In some embodiments, the synchronization control frame 180 may include an I2C field. The I2C field may have any suitable length (e.g., 1 bit) and may be used to indicate that the period of downstream transmission 192 includes an I2C transaction. The I2C field may indicate that the host 110 has provided instructions to remotely access a peripheral device 108 that acts as an I2C slave with respect to an associated slave node 104.

In some embodiments, the synchronization control frame 180 may include a node field. The node field may have any suitable length (e.g., 4 bits) and may be used to indicate which slave node is being addressed for normal and I2C accesses. In discovery mode, this field may be used to program an identifier for a newly discovered slave node 104 in a node ID register of the slave node 104. Each slave node 104 in the system 100 may be assigned a unique ID when the slave node 104 is discovered by the master node 102, as discussed below. In some embodiments, the master node 102 does not have a node ID, while in other embodiments, the master node 102 may have a node ID. In some embodiments, the slave node 104 attached to the master node 102 on the bus 106 (e.g., the slave node 0 in FIG. 1) will be slave node 0, and each successive slave node 104 will have a number that is 1 higher than the previous slave node. However, this is simply illustrative, and any suitable slave node identification system may be used.

In some embodiments, the synchronization control frame 180 may include a read/write (RW) field. The RW field may have any suitable length (e.g., 1 bit) and may be used to control whether normal accesses are reads (e.g., RW=1) or writes (e.g., RW=0).

In some embodiments, the synchronization control frame 180 may include an address field. The address field may have any suitable length (e.g., 8 bits) and may be used to address specific registers of a slave node 104 through the bus 106. For I2C transactions, the address field may be replaced with I2C control values, such as START/STOP, WAIT, RW, and DATA VLD. For discovery transactions, the address field may have a predetermined value (e.g., as illustrated in FIG. 5).

In some embodiments, the synchronization control frame 180 may include a data field. The data field may have any suitable length (e.g., 8 bits) and may be used for normal, I2C, and broadcast writes. The RESPCYCS value, multiplied by 4, may be used to determine how many cycles a newly discovered node should allow to elapse between the start of the synchronization control frame 180 being received and the start of the synchronization response frame 197 being transmitted. When the NAM field indicates discovery mode, the node address and data fields discussed below may be encoded as a RESPCYCS value that, when multiplied by a suitable optional multiplier (e.g., 4), indicates the time, in bits, from the end of the synchronization control frame 180 to the start of the synchronization response frame 197. This allows a newly discovered slave node 104 to determine the appropriate time slot for upstream transmission.

In some embodiments, the synchronization control frame 180 may include a cyclic redundancy check (CRC) field. The CRC field may have any suitable length (e.g., 16 bits) and may be used to transmit a CRC value for the control data 184 of the synchronization control frame 180 following the preamble 182. In some embodiments, the CRC may be calculated in accordance with the CCITT-CRC error detection scheme.

In some embodiments, at least a portion of the synchronization control frame 180 between the preamble 182 and the CRC field may be scrambled in order to reduce the likelihood that a sequence of bits in this interval will periodically match the preamble 182 (and thus may be misinterpreted by the slave node 104 as the start of a new superframe 190), as well as to reduce electromagnetic emissions as noted above. In some such embodiments, the CNT field of the synchronization control frame 180 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the slave nodes 104 or to reduce the likelihood that the preamble 182 shows up elsewhere in the synchronization control frame 180, in addition to or in lieu of techniques such as scrambling and/or error encoding as discussed above. For example, a longer synchronization sequence may be used so as to reduce the likelihood that a particular encoding of the remainder of the synchronization control frame 180 will match it. Additionally or alternatively, the remainder of the synchronization control frame may be structured so that the synchronization sequence cannot occur, such as by placing fixed "0" or "1" values at appropriate bits.

The master node 102 may send read and write requests to the slave nodes 104, including both requests specific to communication on the bus 106 and I2C requests. For example, the master node 102 may send read and write requests (indicated using the RW field) to one or more designated slave nodes 104 (using the NAM and node fields) and can indicate whether the request is a request for the slave node 104 specific to the bus 106, an I2C request for the slave node 104, or an I2C request to be passed along to an I2C-compatible peripheral device 108 coupled to the slave node 104 at one or more I2C ports of the slave node 104.

Turning to upstream communication, the synchronization response frame 197 may begin each upstream transmission. In some embodiments, the synchronization response frame 197 may be 64 bits in length, but any other suitable length may be used. The synchronization response frame 197 may also include a preamble, as discussed above with reference to the preamble 182 of the synchronization control frame 180, followed by data portion. At the end of a downstream transmission, the last slave node 104 on the bus 106 may wait until the RESPCYCS counter has expired and then begin transmitting a synchronization response frame 197 upstream. If an upstream slave node 104 has been targeted by a normal read or write transaction, a slave node 104 may generate its own synchronization response frame 197 and replace the one received from downstream. If any slave node 104 does not see a synchronization response frame 197 from a downstream slave node 104 at the expected time, the slave node 104 will generate its own synchronization response frame 197 and begin transmitting it upstream.

The data portion of the synchronization response frame 197 may include fields that contain data used to communicate response information back to the master node 102. Examples of these fields are discussed below, and some embodiments are illustrated in FIG. 6. In particular, FIG. 6 illustrates example formats for the synchronization response frame 197 in normal mode, I2C mode, and discovery mode, in accordance with various embodiments.

In some embodiments, the synchronization response frame 197 may include a count (CNT) field. The CNT field may have any suitable length (e.g., 2 bits) and may be used to transmit the value of the CNT field in the previously received synchronization control frame 180.

In some embodiments, the synchronization response frame 197 may include an acknowledge (ACK) field. The ACK field may have any suitable length (e.g., 2 bits), and may be inserted by a slave node 104 to acknowledge a command received in the previous synchronization control frame 180 when that slave node 104 generates the synchronization response frame 197. Example indicators that may be communicated in the ACK field include wait, acknowledge, not acknowledge (NACK), and retry. In some embodiments, the ACK field may be sized to transmit an acknowledgment by a slave node 104 that it has received and processed a broadcast message (e.g., by transmitting a broadcast acknowledgment to the master node 102). In some such embodiments, a slave node 104 also may indicate whether the slave node 104 has data to transmit (which could be used, for example, for demand-based upstream transmissions, such as non-TDM inputs from a keypad or touchscreen, or for prioritized upstream transmission, such as when the slave node 104 wishes to report an error or emergency condition).

In some embodiments, the synchronization response frame 197 may include an I2C field. The I2C field may have any suitable length (e.g., 1 bit) and may be used to transmit the value of the I2C field in the previously received synchronization control frame 180.

In some embodiments, the synchronization response frame 197 may include a node field. The node field may have any suitable length (e.g., 4 bits) and may be used to transmit the ID of the slave node 104 that generates the synchronization response frame 197.

In some embodiments, the synchronization response frame 197 may include a data field. The data field may have any suitable length (e.g., 8 bits), and its value may depend on the type of transaction and the ACK response of the slave node 104 that generates the synchronization response frame 197. For discovery transactions, the data field may include the value of the RESPCYCS field in the previously received synchronization control frame 180. When the ACK field indicates a NACK, or when the synchronization response frame 197 is responding to a broadcast transaction, the data field may include a broadcast acknowledge (BA) indicator (in which the last slave node 104 may indicate if the broadcast write was received without error), a discovery error (DER) indicator (indicating whether a newly discovered slave node 104 in a discovery transaction matches an existing slave node 104), and a CRC error (CER) indicator (indicating whether a NACK was caused by a CRC error).

In some embodiments, the synchronization response frame 197 may include a CRC field. The CRC field may have any suitable length (e.g., 16 bits) and may be used to transmit a CRC value for the portion of the synchronization response frame 197 between the preamble and the CRC field.

In some embodiments, the synchronization response frame 197 may include an interrupt request (IRQ) field. The IRQ field may have any suitable length (e.g., 1 bit) and may be used to indicate that an interrupt has been signaled from a slave node 104.

In some embodiments, the synchronization response frame 197 may include an IRQ node (IRQNODE) field. The IRQNODE field may have any suitable length (e.g., 4 bits) and may be used to transmit the ID of the slave node 104 that has signaled the interrupt presented by the IRQ field. In some embodiments, the slave node 104 for generating the IRQ field will insert its own ID into the IRQNODE field.

In some embodiments, the synchronization response frame 197 may include a second CRC (CRC-4) field. The CRC-4 field may have any suitable length (e.g., 4 bits) and may be used to transmit a CRC value for the IRQ and IRQNODE fields.

In some embodiments, the synchronization response frame 197 may include an IRQ field, an IRQNODE field, and a CRC-4 field as the last bits of the synchronization response frame 197 (e.g., the last 10 bits). As discussed above, these interrupt-related fields may have their own CRC protection in the form of CRC-4 (and thus not protected by the preceding CRC field). Any slave node 104 that needs to signal an interrupt to the master node 102 will insert its interrupt information into these fields. In some embodiments, a slave node 104 with an interrupt pending may have higher priority than any slave node 104 further downstream that also has an interrupt pending. The last slave node 104 along the bus 106 (e.g., the slave node 2 in FIG. 1) may always populate these interrupt fields. If the last slave node 104 has no interrupt pending, the last slave node 104 may set the IRQ bit to 0, the IRQNODE field to its node ID, and provide the correct CRC-4 value. For convenience, a synchronization response frame 197 that conveys an interrupt may be referred to herein as an "interrupt frame."

In some embodiments, at least a portion of the synchronization response frame 197 between the preamble 182 and the CRC field may be scrambled in order to reduce emissions. In some such embodiments, the CNT field of the synchronization response frame 197 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the slave nodes 104 or to reduce the likelihood that the preamble 182 shows up elsewhere in the synchronization response frame 197, in addition to or in lieu of techniques such as scrambling and/or error encoding as discussed above. For example, a longer synchronization sequence may be used so as to reduce the likelihood that a particular encoding of the remainder of the synchronization response frame 180 will match it. Additionally or alternatively, the remainder of the synchronization response frame may be structured so that the synchronization sequence cannot occur, such as by placing fixed "0" or "1" values at appropriate bits.

Figure 7:
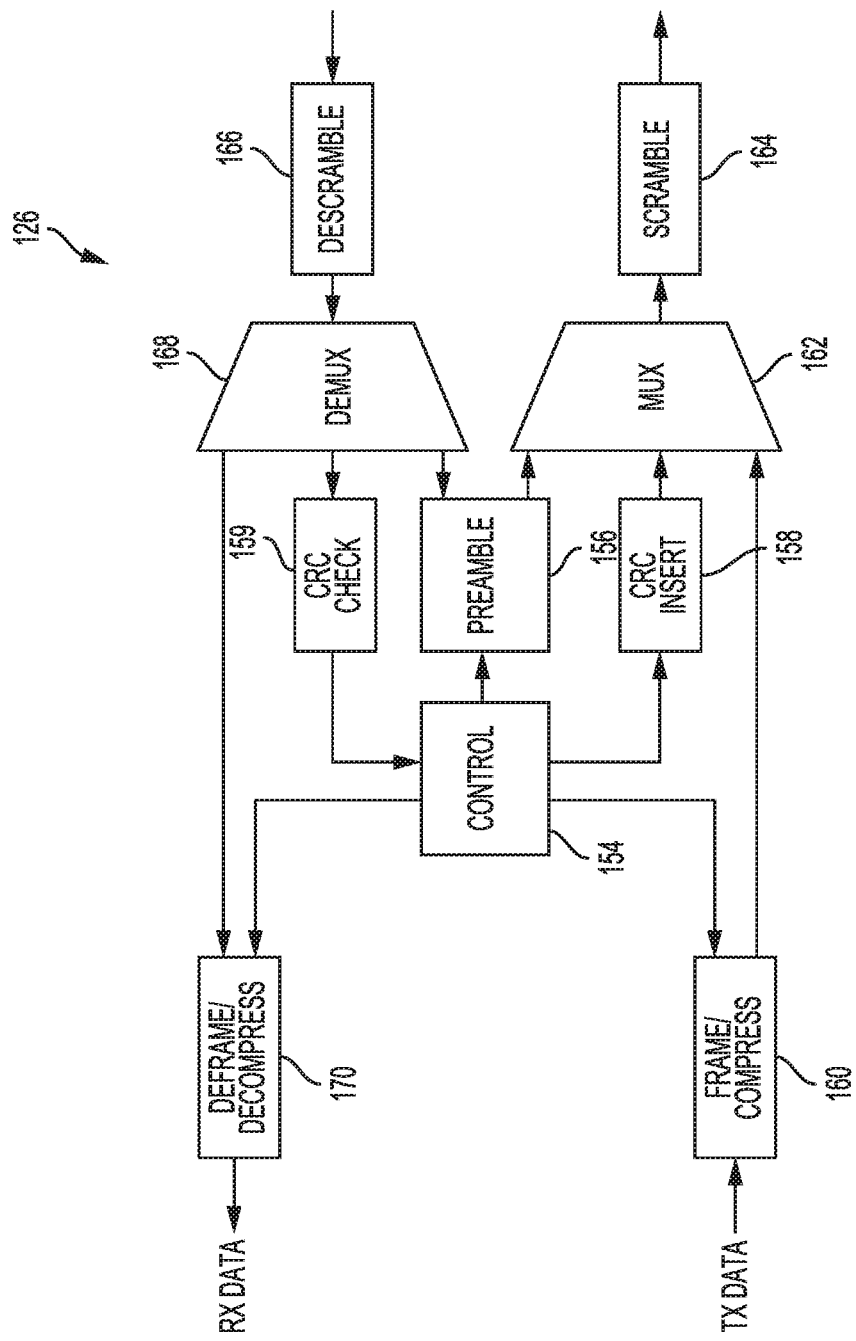
FIG. 7 is a block diagram of various components of the bus protocol circuitry of FIG. 2, in accordance with various embodiments.

FIG. 7 is a block diagram of the bus protocol circuitry 126 of FIG. 2, in accordance with various embodiments. The bus protocol circuitry 126 may include control circuitry 154 to control the operation of the node transceiver 120 in accordance with the protocol for the bus 106 described herein. In particular, the control circuitry 154 may control the generation of synchronization frames for transmission (e.g., synchronization control frames or synchronization response frames, as discussed above), the processing of received synchronization frames, and the performance of control operations specified in received synchronization control frames. The control circuitry 154 may include programmable registers, as discussed below. The control circuitry 154 may create and receive synchronization control frames, react appropriately to received messages (e.g., associated with a synchronization control frame when the bus protocol circuitry 126 is included in a slave node 104 or from an I2C device when the bus protocol circuitry 126 is included in a master node 102), and adjust the framing to the different operational modes (e.g., normal, discovery, standby, etc.).

When the node transceiver 120 is preparing data for transmission along the bus 106, preamble circuitry 156 may be configured to generate preambles for synchronization frames for transmission, and to receive preambles from received synchronization frames. In some embodiments, a downstream synchronization control frame preamble may be sent by the master node 102 every 1024 bits. As discussed above, one or more slave nodes 104 may synchronize to the downstream synchronization control frame preamble and generate local, phase-aligned master clocks from the preamble.

Cyclic redundancy check (CRC) insert circuitry 158 may be configured to generate one or more CRCs for synchronization frames for transmission. Frame/compress circuitry 160 may be configured to take incoming data from the I2S/TDM/PDM transceiver 127 (e.g., from a frame buffer associated with the transceiver 127) and/or the I2C transceiver 129, optionally compress the data, and optionally generate parity check bits or error correction codes (ECC) for the data. A multiplexer (MUX) 162 may multiplex a preamble from the preamble circuitry 156, synchronization frames, and data into a stream for transmission. In some embodiments, the transmit stream may be scrambled by scrambling circuitry 164 before transmission.

For example, in some embodiments, the frame/compress circuitry 160 may apply a floating point compression scheme. In such an embodiment, the control circuitry 154 may transmit 3 bits to indicate how many repeated sign bits are in the number, followed by a sign bit and N-4 bits of data, where N is the size of the data to be transmitted over the bus 106. The use of data compression may be configured by the master node 102 when desired.

In some embodiments, the receive stream entering the node transceiver 120 may be descrambled by the descrambling circuitry 166. A demultiplexer (DEMUX) 168 may demultiplex the preamble, synchronization frames, and data from the receive stream. CRC check circuitry 159 on the receive side may check received synchronization frames for the correct CRC. When the CRC check circuitry 159 identifies a CRC failure in an incoming synchronization control frame 180, the control circuitry 154 may be notified of the failure and will not perform any control commands in the control data 184 of the synchronization control frame 180. When the CRC check circuitry 159 identifies a CRC failure in an incoming synchronization response frame 197, the control circuitry 154 may be notified of the failure and may generate an interrupt for transmission to the host 110 in an interrupt frame. Deframe/decompress circuitry 170 may accept receive data, optionally check its parity, optionally perform error detection and correction (e.g., single error correction—double error detection (SECDED)), optionally decompress the data, and may write the receive data to the I2S/TDM/PDM transceiver 127 (e.g., a frame buffer associated with the transceiver 127) and/or the I2C transceiver 129.

As discussed above, upstream and downstream data may be transmitted along the bus 106 in TDM data slots within a superframe 190. The control circuitry 154 may include registers dedicated to managing these data slots on the bus 106, a number of examples of which are discussed below. When the control circuitry 154 is included in a master node 102, the values in these registers may be programmed into the control circuitry 154 by the host 110. When the control circuitry 154 is included in a slave node 104, the values in these registers may be programmed into the control circuitry 154 by the master node 102.

In some embodiments, the control circuitry 154 may include a downstream slots (DNSLOTS) register. When the node transceiver 120 is included in the master node 102, this register may hold the value of the total number of downstream data slots. This register may also define the number of data slots that will be used for combined I2S/TDM/PDM receive by the I2S/TDM/PDM transceiver 127 in the master node 102. In a slave node 104, this register may define the number of data slots that are passed downstream to the next slave node 104 before or after the addition of locally generated downstream slots, as discussed in further detail below with reference to LDNSLOTS.

In some embodiments, the control circuitry 154 may include a local downstream slots (LDNSLOTS) register. This register may be unused in the master node 102. In a slave node 104, this register may define the number of data slots that the slave node 104 will use and not retransmit. Alternatively, this register may define the number of slots that the slave node 104 may contribute to the downstream bus link 106.

In some embodiments, the control circuitry 154 may include an upstream slots (UPSLOTS) register. In the master node 102, this register may hold the value of the total number of upstream data slots. This register may also define the number of slots that will be used for I2S/TDM transmit by the I2S/TDM/PDM transceiver 127 in the master node 102. In a slave node 104, this register may define the number of data slots that are passed upstream before the slave node 104 begins to add its own data.

In some embodiments, the control circuitry 154 may include a local upstream slots (LUPSLOTS) register. This register may be unused in the master node 102. In a slave node 104, this register may define the number of data slots that the slave node 104 will add to the data received from downstream before it is sent upstream. This register may also define the number of data slots that will be used for combined I2S/TDM/PDM receive by the I2S/TDM/PDM transceiver 127 in the slave node 104.

In some embodiments, the control circuitry 154 may include a broadcast downstream slots (BCDNSLOTS) register. This register may be unused in the master node 102. In a slave node 104, this register may define the number of broadcast data slots. In some embodiments, broadcast data slots may always come at the beginning of the data field. The data in the broadcast data slots may be used by multiple slave nodes 104 and may be passed downstream by all slave nodes 104 whether or not they are used.

In some embodiments, the control circuitry 154 may include a slot format (SLOTFMT) register. This register may define the format of data for upstream and downstream transmissions. The data size for the I2S/TDM/PDM transceiver 127 may also be determined by this register. In some embodiments, valid data sizes include 8, 12, 16, 20, 24, 28, and 32 bits. This register may also include bits to enable floating point compression for downstream and upstream traffic. When floating point compression is enabled, the I2S/TDM data size may be 4 bits larger than the data size over the bus 106. All nodes in the system 100 may have the same values for SLOTFMT when data slots are enabled, and the nodes may be programmed by a broadcast write so that all nodes will be updated with the same value.

FIGS. 8-11 illustrate examples of information exchange along the bus 106, in accordance with various embodiments of the bus protocols described herein. In particular, FIGS. 8-11 illustrate embodiments in which each slave node 104 is coupled to one or more speakers and/or one or more microphones as the peripheral device 108. This is simply illustrative, as any desired arrangement of peripheral device 108 may be coupled to any particular slave node 104 in accordance with the techniques described herein.

Figure 8:
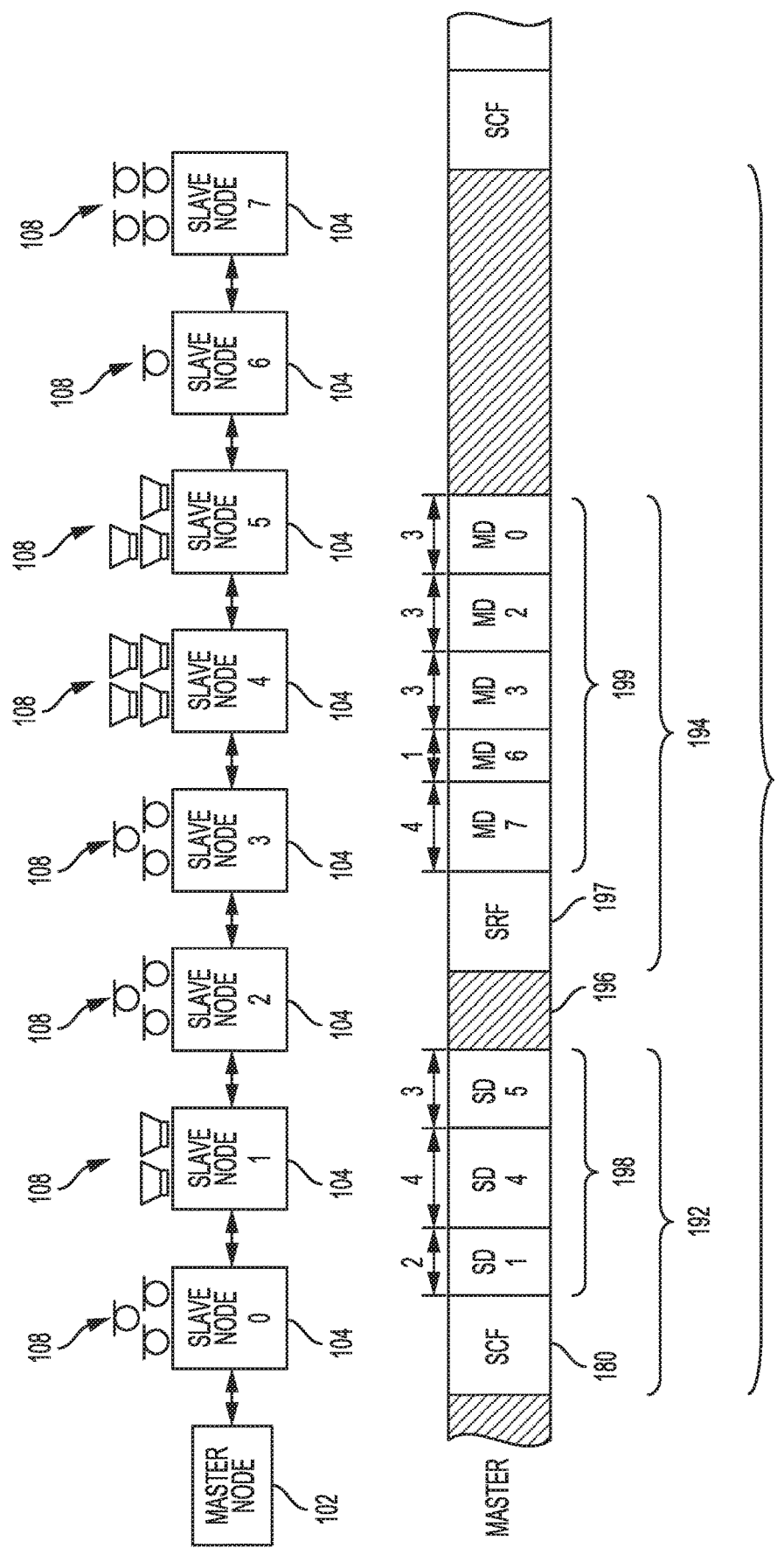
FIGS. 8-11 illustrate examples of information exchange along a two-wire bus, in accordance with various embodiments of the bus protocols described herein.

To begin, FIG. 8 illustrates signaling and timing considerations for bi-directional communication on the bus 106, in accordance with various embodiments. The slave nodes 104 depicted in FIG. 8 have various numbers of sensor/actuator elements, and so different amounts of data may be sent to, or received from, the various slave nodes 104. Specifically, slave node 1 has two elements, slave node 4 has four elements, and slave node 5 has three elements, so the data transmitted by the master node 102 includes two time slots for slave node 1, four time slots for slave node 4, and three time slots for slave node 5. Similarly, slave node 0 has three elements, slave node 2 has three elements, slave node 3 has three elements, slave node 6 has one element, and slave node 7 has four elements, so the data transmitted upstream by those slave nodes 104 includes the corresponding number of time slots. It should be noted that there need not have to be a one-to-one correlation between elements and time slots. For example, a microphone array, included in the peripheral device 108, having three microphones may include a digital signal processor that combines signals from the three microphones (and possibly also information received from the master node 102 or from other slave nodes 104) to produce a single data sample, which, depending on the type of processing, could correspond to a single time slot or multiple time slots.

In FIG. 8, the master node 102 transmits a synchronization control frame (SCF) followed by data for speakers coupled to specific slave nodes 104 (SD). Each successive slave node 104 forwards the synchronization control frame and also forwards at least any data destined for downstream slave nodes 104. A particular slave node 104 may forward all data or may remove data destined for that slave node 104. When the last slave node 104 receives the synchronization control frame, that slave node 104 transmits the synchronization response frame (SRF) optionally followed by any data that the slave node 104 is permitted to transmit. Each successive slave node 104 forwards the synchronization response frame along with any data from downstream slave nodes 104 and optionally inserts data from one or more microphones coupled to the particular slave nodes 104 (MD). In the example of FIG. 8, the master node 102 sends data to slave nodes 1, 4, and 5 (depicted in FIG. 8 as active speakers) and receives data from slave nodes 7, 6, 3, 2, and 0 (depicted in FIG. 8 as microphone arrays).

Figure 9:
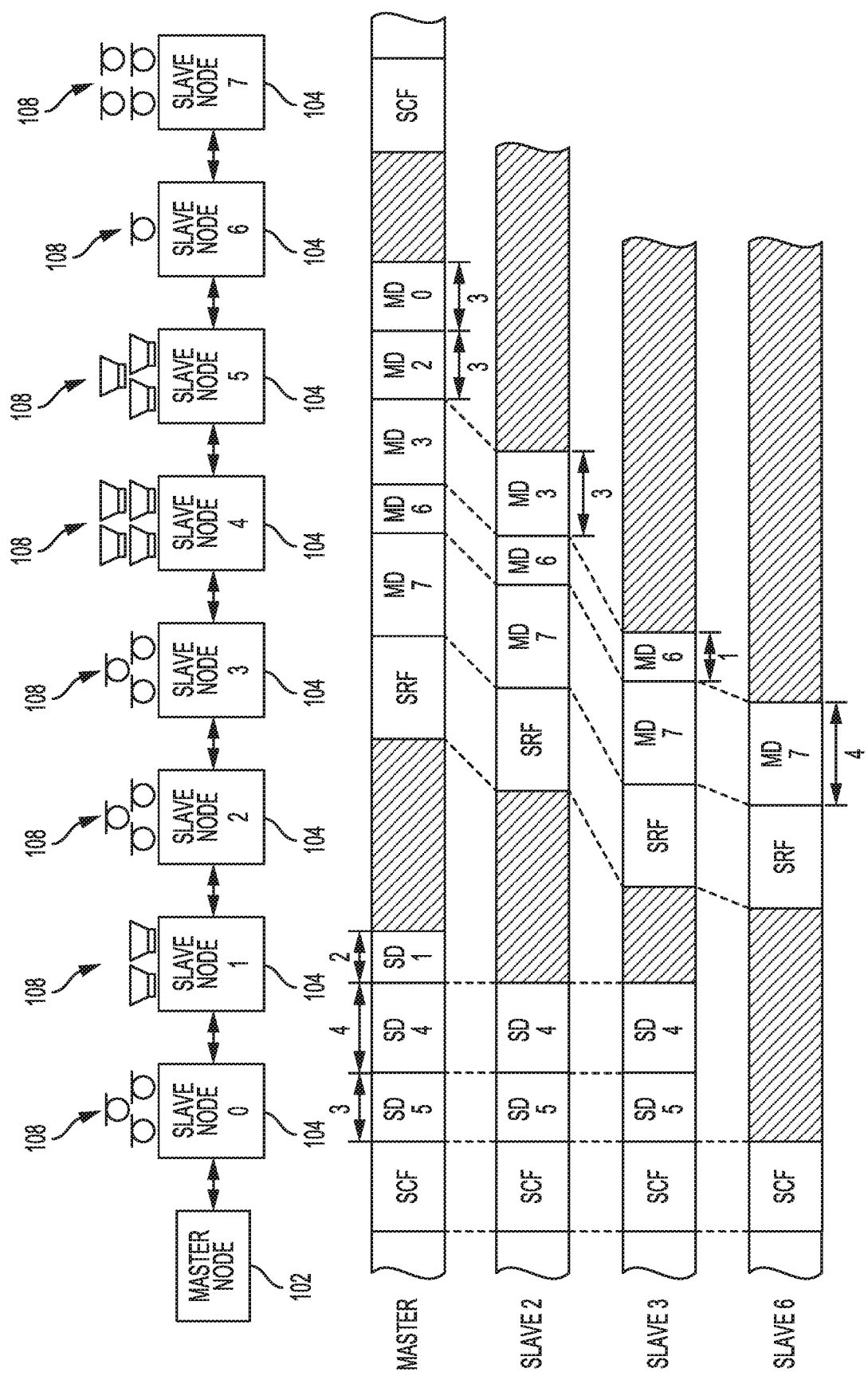

FIG. 9 schematically illustrates the dynamic removal of data from a downstream transmission and insertion of data into an upstream transmission, from the perspective of the downstream DS transceiver 124, in accordance with various embodiments. In FIG. 9, as in FIG. 8, the master node 102 transmits a synchronization control frame (SCF) followed by data for slave nodes 1, 4, and 5 (SD) in reverse order (e.g., data for slave node 5 is followed by data for slave node 4, which is followed by data for slave node 1, etc.) (see the row labeled MASTER). When slave node 1 receives this transmission, slave node 1 removes its own data and forwards to slave node 2 only the synchronization control frame followed by the data for slave nodes 5 and 4. Slave nodes 2 and 3 forward the data unchanged (see the row labeled SLAVE 2), such that the data forwarded by slave node 1 is received by slave node 4 (see the row labeled SLAVE 3). Slave node 4 removes its own data and forwards to slave node 5 only the synchronization control frame followed by the data for slave node 5, and, similarly, slave node 5 removes its own data and forwards to slave node 6 only the synchronization control frame. Slave node 6 forwards the synchronization control frame to slave node 7 (see the row labeled SLAVE 6).

At this point, slave node 7 transmits to slave node 6 the synchronization response frame (SRF) followed by its data (see the row labeled SLAVE 6). Slave node 6 forwards to slave node 5 the synchronization response frame along with the data from slave node 7 and its own data, and slave node 5 in turn forwards to slave node 4 the synchronization response frame along with the data from slave nodes 7 and 6. Slave node 4 has no data to add, so it simply forwards the data to slave node 3 (see the row labeled SLAVE 3), which forwards the data along with its own data to slave node 2 (see the row labeled SLAVE 2), which in turn forwards the data along with its own data to slave node 1. Slave node 1 has no data to add, so it forwards the data to slave node 0, which forwards the data along with its own data. As a result, the master node 102 receives the synchronization response frame followed by the data from slave nodes 7, 6, 3, 2, and 0 (see the row labeled MASTER).

Figure 10:
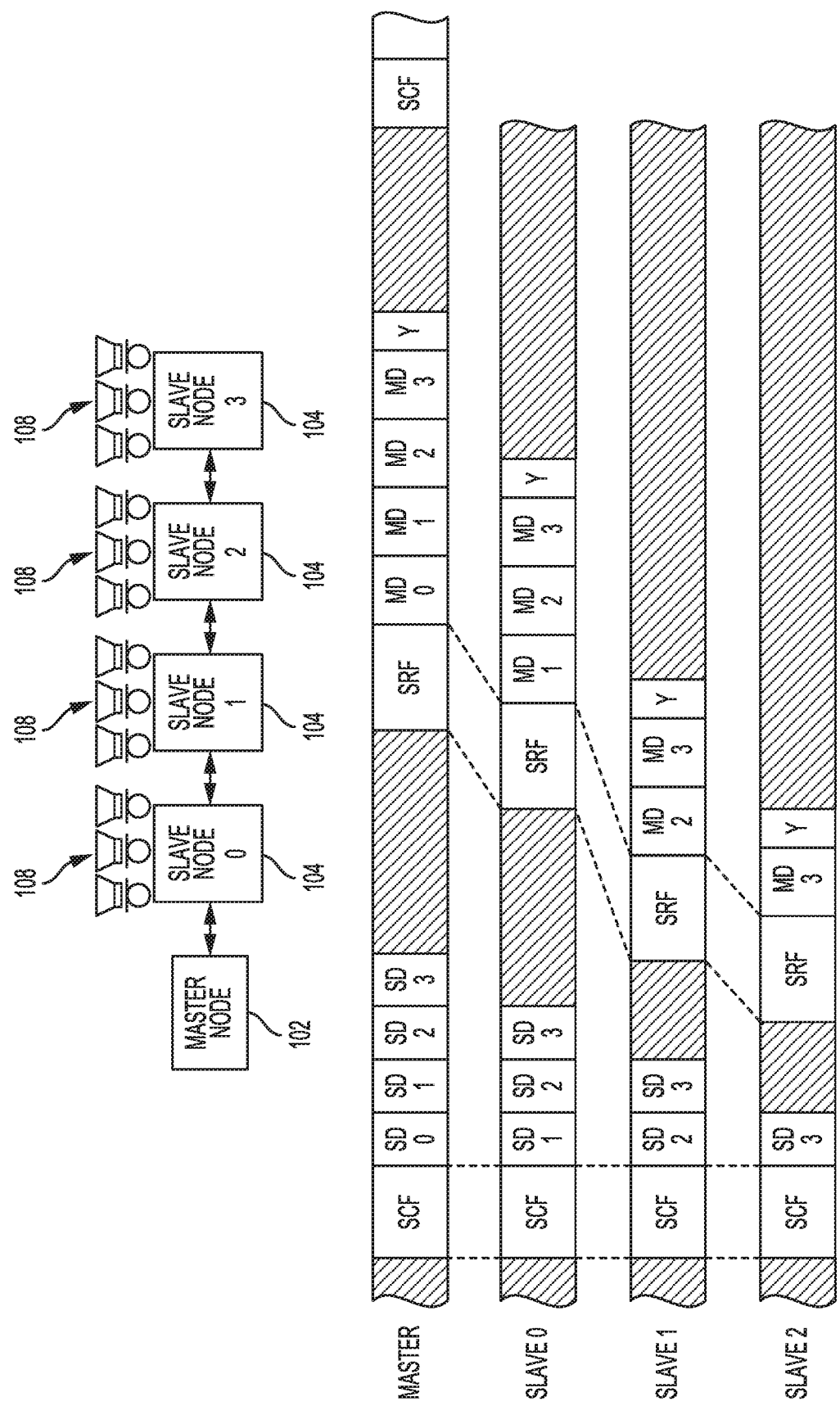

FIG. 10 illustrates another example of the dynamic removal of data from a downstream transmission and insertion of data into an upstream transmission, from the perspective of the downstream DS transceiver 124, as in FIG. 9, although in FIG. 10, the slave nodes 104 are coupled with both sensors and actuators as the peripheral device 108 such that the master node 102 sends data downstream to all of the slave nodes 104 and receives data back from all of the slave nodes 104. Also, in FIG. 10, the data is ordered based on the node address to which it is destined or from which it originates. The data slot labeled "Y" may be used for a data integrity check or data correction.

Figure 11:
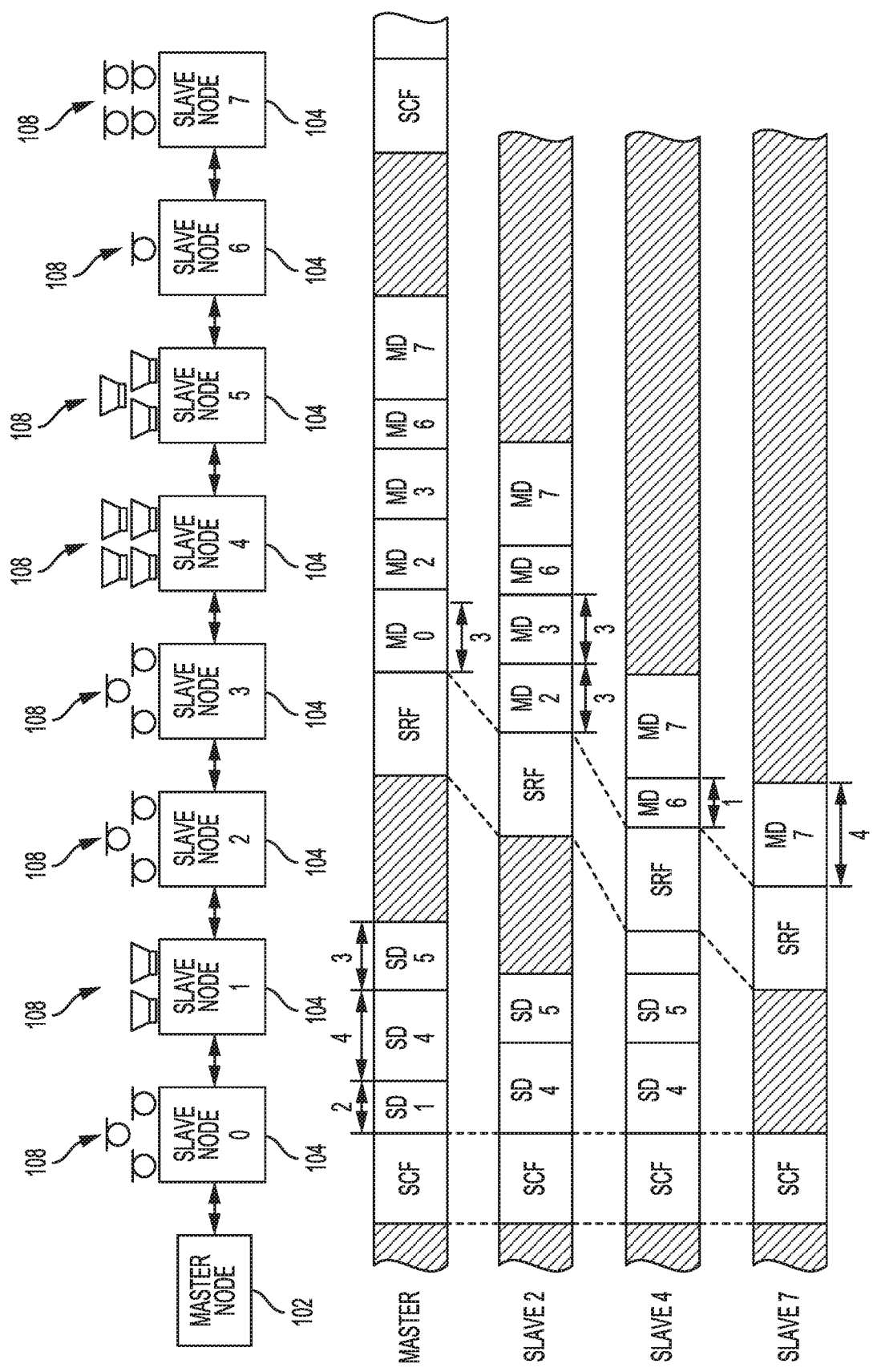

FIG. 11 illustrates another example of the dynamic removal of data from a downstream transmission and insertion of data into an upstream transmission, from the perspective of the downstream DS transceiver 124, as in FIG. 9, although in FIG. 11, the data is conveyed downstream and upstream in sequential order rather than reverse order. Buffering at each slave node 104 allows for selectively adding, removing, and/or forwarding data.

As discussed above, each slave node 104 may remove data from downstream or upstream transmissions and/or may add data to downstream or upstream transmissions. Thus, for example, the master node 102 may transmit a separate sample of data to each of a number of slave nodes 104, and each such slave node 104 may remove its data sample and forward only data intended for downstream slaves. On the other hand, a slave node 104 may receive data from a downstream slave node 104 and forward the data along with additional data. One advantage of transmitting as little information as needed is to reduce the amount of power consumed collectively by the system 100.

The system 100 may also support broadcast transmissions (and multicast transmissions) from the master node 102 to the slave nodes 104, specifically through configuration of the downstream slot usage of the slave nodes 104. Each slave node 104 may process the broadcast transmission and pass it along to the next slave node 104, although a particular slave node 104 may "consume" the broadcast message, (i.e., not pass the broadcast transmission along to the next slave node 104).

The system 100 may also support upstream transmissions (e.g., from a particular slave node 104 to one or more other slave nodes 104). Such upstream transmissions can include unicast, multicast, and/or broadcast upstream transmissions. With upstream addressing, as discussed above with reference to downstream transmissions, a slave node 104 may determine whether or not to remove data from an upstream transmission and/or whether or not to pass an upstream transmission along to the next upstream slave node 104 based on configuration of the upstream slot usage of the slave nodes 104. Thus, for example, data may be passed by a particular slave node 104 to one or more other slave nodes 104 in addition to, or in lieu of, passing the data to the master node 102. Such slave-slave relationships may be configured, for example, via the master node 102.

Thus, in various embodiments, the slave nodes 104 may operate as active/intelligent repeater nodes, with the ability to selectively forward, drop, and add information. The slave nodes 104 may generally perform such functions without necessarily decoding/examining all of the data, since each slave node 104 knows the relevant time slot(s) within which it will receive/transmit data, and hence can remove data from or add data into a time slot. Notwithstanding that the slave nodes 104 may not need to decode/examine all data, the slave nodes 104 may typically re-clock the data that it transmits/forwards. This may improve the robustness of the system 100.

Figure 12:
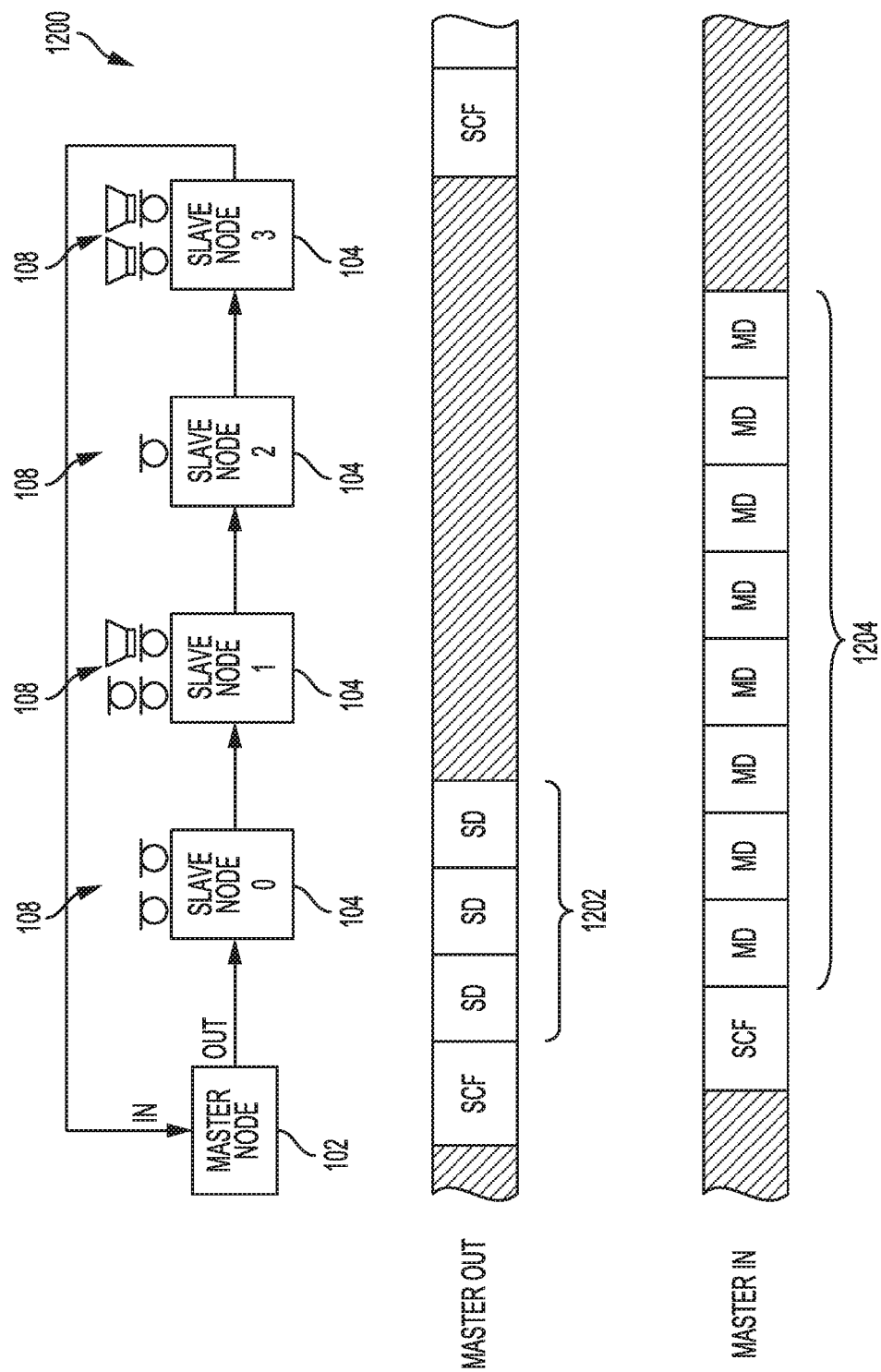
FIG. 12 illustrates a ring topology for the two-wire bus and a unidirectional communication scheme thereon, in accordance with various embodiments.

In some embodiments, the bus 106 may be configured for unidirectional communications in a ring topology. For example, FIG. 12 illustrates an arrangement 1200 of the master node 102 and four slave nodes 104 in a ring topology, and illustrates signaling and timing considerations for unidirectional communication in the arrangement 1200, in accordance with various embodiments. In such embodiments, the transceivers 120 in the nodes may include a receive-only transceiver (MASTER IN) and a transmit-only transceiver (MASTER OUT), rather than two bi-directional transceivers for upstream and downstream communication. In the link-layer synchronization scheme illustrated in FIG. 12, the master node 102 transmits a synchronization control frame (SCF) 180, optionally followed by "downstream" data 1202 for the three speakers coupled to various slave nodes 104 (the data for the different speakers may be arranged in any suitable order, as discussed above with reference to FIGS. 8-11), and each successive slave node 104 forwards the synchronization control frame 180 along with any "upstream" data from prior slave nodes 104 and "upstream" data of its own to provide "upstream" data 1204 (e.g., the data from the eight different microphones may be arranged in any suitable order, as discussed above with reference to FIGS. 8-11).

As described herein, data may be communicated between elements of the system 100 in any of a number of ways. In some embodiments, data may be sent as part of a set of synchronous data slots upstream (e.g., using the data slots 199) by a slave node 104 or downstream (e.g., using the data slots 198) by a slave node 104 or a master node 102. The volume of such data may be adjusted by changing the number of bits in a data slot, or including extra data slots. Data may also be communicated in the system 100 by inclusion in a synchronization control frame 180 or a synchronization response frame 197. Data communicated this way may include I2C control data from the host 110 (with a response from a peripheral device 108 associated with a slave node 104); accesses to registers of the slave nodes 104 (e.g., for discovery and configuration of slots and interfaces) that may include write access from the host 110/master node 102 to a slave node 104 and read access from a slave node 104 to the host 110/master node 102; and event signaling via interrupts from a peripheral device 108 to the host 110. In some embodiments, GPIO pins may be used to convey information from a slave node 104 to the master node 102 (e.g., by having the master node 102 poll the GPIO pins over I2C, or by having a node transceiver 120 of a slave node 104 generate an interrupt at an interrupt request pin). For example, in some such embodiments, a host 110 may send information to the master node 102 via I2C, and then the master node 102 may send that information to the slave via the GPIO pins. Any of the types of data discussed herein as transmitted over the bus 106 may be transmitted using any one or more of these communication pathways. Other types of data and data communication techniques within the system 100 may be disclosed herein.

Figure 13:
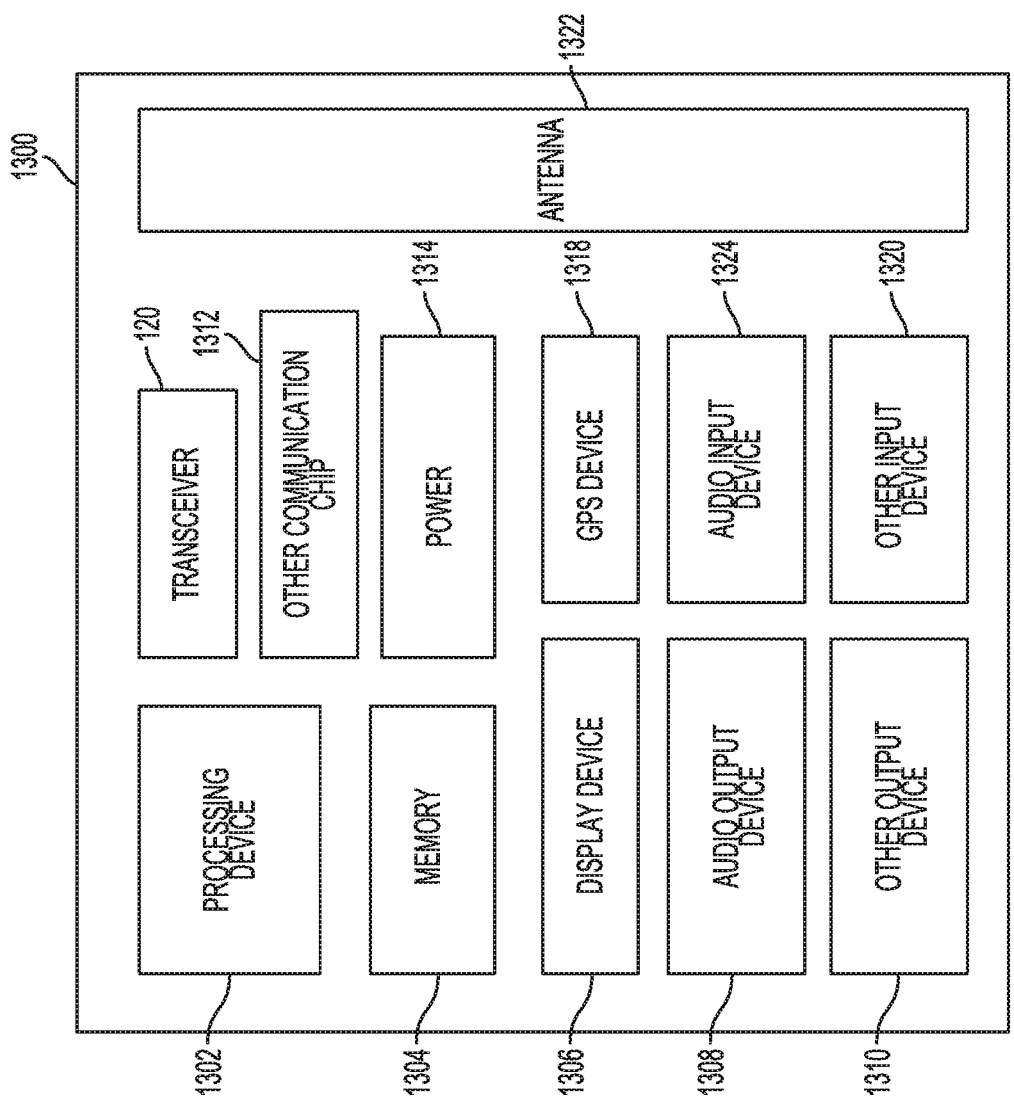
FIG. 13 schematically illustrates a device that may serve as a node or host in the system of FIG. 1, in accordance with various embodiments.

Embodiments of the present disclosure may be implemented into a system using any suitable hardware and/or software to configure as desired. FIG. 13 schematically illustrates a device 1300 that may serve as a host or a node (e.g., a host 110, a master node 102, or a slave node 104) in the system 100, in accordance with various embodiments. A number of components are illustrated in FIG. 13 as included in the device 1300, but any one or more of these components may be omitted or duplicated, as suitable for the application.

Additionally, in various embodiments, the device 1300 may not include one or more of the components illustrated in FIG. 13, but the device 1300 may include interface circuitry for coupling to the one or more components. For example, the device 1300 may not include a display device 1306, but may include display device interface circuitry (e.g., a connector and driver circuitry) to which a display device 1306 may be coupled. In another set of examples, the device 1300 may not include an audio input device 1324 or an audio output device 1308, but may include audio input or output device interface circuitry (e.g., connectors and supporting circuitry) to which an audio input device 1324 or audio output device 1308 may be coupled.

The device 1300 may include the node transceiver 120, in accordance with any of the embodiments disclosed herein, for managing communication along the bus 106 when the device 1300 is coupled to the bus 106. The device 1300 may include a processing device 1302 (e.g., one or more processing devices), which may be included in the node transceiver 120 or separate from the node transceiver 120. As used herein, the term "processing device" may refer to any device or portion of a device that processes electronic data from registers and/or memory to transform that electronic data into other electronic data that may be stored in registers and/or memory. The processing device 1302 may include one or more digital signal processors (DSPs), application-specific integrated circuits (ASICs), central processing units (CPUs), graphics processing units (GPUs), cryptoprocessors, or any other suitable processing devices. The device 1300 may include a memory 1304, which may itself include one or more memory devices such as volatile memory (e.g., dynamic random access memory (DRAM)), non-volatile memory (e.g., read-only memory (ROM)), flash memory, solid state memory, and/or a hard drive.

In some embodiments, the memory 1304 may be employed to store a working copy and a permanent copy of programming instructions to cause the device 1300 to perform any suitable ones of the techniques disclosed herein. In some embodiments, machine-accessible media (including non-transitory computer-readable storage media), methods, systems, and devices for performing the above-described techniques are illustrative examples of embodiments disclosed herein for communication over a two-wire bus. For example, a computer-readable media (e.g., the memory 1304) may have stored thereon instructions that, when executed by one or more of the processing devices included in the processing device 1302, cause the device 1300 to perform any of the techniques disclosed herein.

In some embodiments, the device 1300 may include another communication chip 1312 (e.g., one or more other communication chips). For example, the communication chip 1312 may be configured for managing wireless communications for the transfer of data to and from the device 1300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

The communication chip 1312 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The one or more communication chips 1312 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The one or more communication chips 1312 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The one or more communication chips 1312 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1312 may operate in accordance with other wireless protocols in other embodiments. The device 1300 may include an antenna 1322 to facilitate wireless communications and/or to receive other wireless communications (such as AM or FM radio transmissions).

In some embodiments, the communication chip 1312 may manage wired communications using a protocol other than the protocol for the bus 106 described herein. Wired communications may include electrical, optical, or any other suitable communication protocols. Examples of wired communication protocols that may be enabled by the communication chip 1312 include Ethernet, controller area network (CAN), I2C, media-oriented systems transport (MOST), or any other suitable wired communication protocol.

As noted above, the communication chip 1312 may include multiple communication chips. For instance, a first communication chip 1312 may be dedicated to shorter-range wireless communications such as Wi-Fi or Bluetooth, and a second communication chip 1312 may be dedicated to longer-range wireless communications such as GPS, EDGE, GPRS, CDMA, WiMAX, LTE, EV-DO, or others. In some embodiments, a first communication chip 1312 may be dedicated to wireless communications, and a second communication chip 1312 may be dedicated to wired communications.

The device 1300 may include battery/power circuitry 1314. The battery/power circuitry 1314 may include one or more energy storage devices (e.g., batteries or capacitors) and/or circuitry for coupling components of the device 1300 to an energy source separate from the device 1300 (e.g., AC line power, voltage provided by a car battery, etc.). For example, the battery/power circuitry 1314 may include the upstream filtering circuitry 132 and the downstream filtering circuitry 131 discussed above with reference to FIG. 2 and could be charged by the bias on the bus 106.

The device 1300 may include a display device 1306 (or corresponding interface circuitry, as discussed above). The display device 1306 may include any visual indicators, such as a heads-up display, a computer monitor, a projector, a touchscreen display, a liquid crystal display (LCD), a light-emitting diode display, or a flat panel display, for example.

The device 1300 may include an audio output device 1308 (or corresponding interface circuitry, as discussed above). The audio output device 1308 may include any device that generates an audible indicator, such as speakers, headsets, or earbuds, for example.

The device 1300 may include an audio input device 1324 (or corresponding interface circuitry, as discussed above). The audio input device 1324 may include any device that generates a signal representative of a sound, such as microphones, microphone arrays, or digital instruments (e.g., instruments having a musical instrument digital interface (MIDI) output).

The device 1300 may include a global positioning system (GPS) device 1318 (or corresponding interface circuitry, as discussed above). The GPS device 1318 may be in communication with a satellite-based system and may receive a location of the device 1300, as known in the art.

The device 1300 may include another output device 1310 (or corresponding interface circuitry, as discussed above). Examples of the other output device 1310 may include an audio codec, a video codec, a printer, a wired or wireless transmitter for providing information to other devices, or an additional storage device. Additionally, any suitable ones of the peripheral devices 108 discussed herein may be included in the other output device 1310.

The device 1300 may include another input device 1320 (or corresponding interface circuitry, as discussed above). Examples of the other input device 1320 may include an accelerometer, a gyroscope, an image capture device, a keyboard, a cursor control device such as a mouse, a stylus, a touchpad, a bar code reader, a Quick Response (QR) code reader, or a radio frequency identification (RFID) reader. Additionally, any suitable ones of the sensors or peripheral devices 108 discussed herein may be included in the other input device 1320.

Any suitable ones of the display, input, output, communication, or memory devices described above with reference to the device 1300 may serve as the peripheral device 108 in the system 100. Alternatively or additionally, suitable ones of the display, input, output, communication, or memory devices described above with reference to the device 1300 may be included in a host (e.g., the host 110) or a node (e.g., a master node 102 or a slave node 104).

FIGS. 14-28 illustrate various systems and techniques for remote bus enable in the system 100 of FIG. 1. These systems and techniques may be used with any of the embodiments of the system 100 disclosed herein, including any of the embodiments of the master node 102 and slave node 104. Remarks about the operation and components of various ones of the embodiments illustrated in FIGS. 14-28 accompany the drawings. In these embodiments, a voltage regulator 111-1 associated with the master node 102 may have an "enable" input (e.g., a pin) that enables the operation of the voltage regulator 111-1 in response to a high (or low, as predetermined) voltage at the enable input. When the voltage regulator 111-1 is enabled, the voltage regulator 111-1 may provide an operational voltage to the master node 102 to enable it to control normal bus operations as described herein; when the voltage regulator 111-1 is not enabled, the voltage regulator 111-1 may not provide an operational voltage to the master node 102, and the master node 102 may be in a low power mode (e.g., a standby mode, an idle mode, a sleep mode, etc.). Enabling the master node 102 to control communications along the bus 106 may be referred to herein as "enabling the bus 106."

Certain circuits and operational details may be discussed with respect to various ones of the embodiments of FIGS. 14-28, and they may apply to other ones of the embodiments of FIGS. 14-28, but may not be repeated for economy of illustration. In the embodiments illustrated in FIGS. 14-28, the master node 102 may include a node transceiver 120-1 and associated downstream filtering circuitry 131, and the slave node 104 may include a node transceiver 120-1 and associated upstream filtering circuitry 132. FIGS. 14-28 also illustrates the slave node 104 including downstream filtering circuitry 131, appropriate when there are further downstream slave nodes 104 (not shown) in the system 100. Power may be provided to the master node 102 by a power supply 119 (e.g., a battery or other power supply device); a voltage regulator 111-1 may be disposed between the power supply 119 and the master node 102 such that the output of the power supply 119 is input to the voltage regulator 111-1. Diodes included in various ones of the embodiments illustrated in FIGS. 14-28 may help protect against inadvertent current flow, and may be included or not included as appropriate. The embodiments of FIGS. 14-28 include a number of high pass filters (HPF) and low pass filters (LPF) arranged in various ways; any suitable HPF and LPF circuits may be used.

In some embodiments, the voltage regulator 111-1 and the power supply 119 may be integrated into a single voltage regulated power supply. Thus, the "voltage regulators 111" disclosed herein may be understood to represent any suitable power supply. The switches illustrated in any of FIGS. 14-28 may be provided by mechanically actuated switches or electronic switches that are closed/opened in response to a control signal (e.g., a sound level above a threshold, a wireless communication received from a smartphone or remote control, etc.). For example, a switch may be a push button switch, a dial, a field effect transistor (FET) switch controlled by a microcontroller, etc.

Although not shown in FIGS. 14-28, in some embodiments, an additional voltage regulator or Zener diode may be used at the enable input of the voltage regulator 111-1 to achieve a more tightly controlled enable voltage. Although not shown in FIGS. 14-28, in some embodiments, an additional voltage regulator or Zener diode may be used at the I/O pins of the host 110 and/or the node transceivers 120 (e.g., to protect these pins by limiting the maximum voltage that may be applied).

Figure 14:
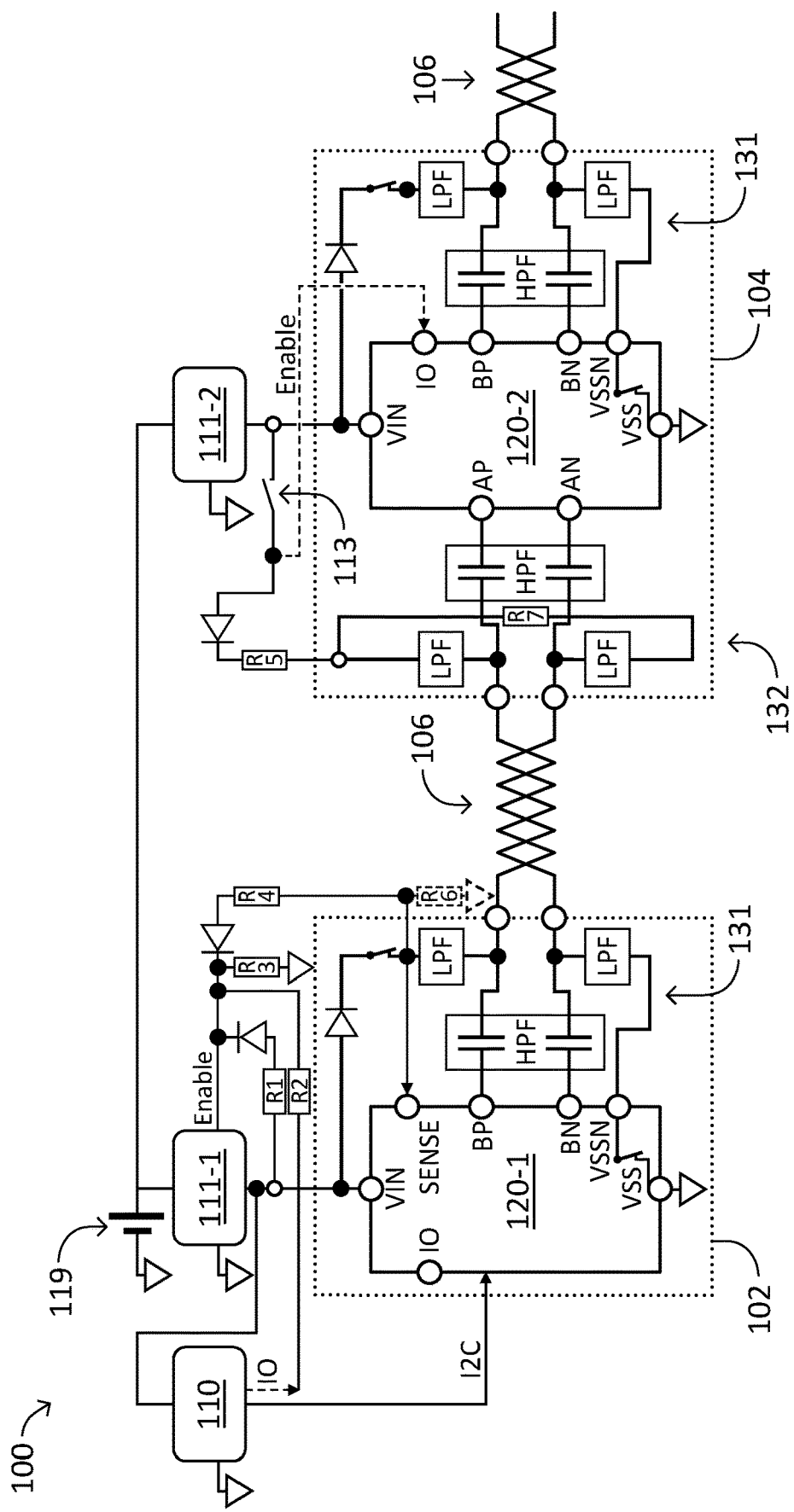
FIGS. 14-28 illustrate arrangements for remote bus enable in the system of FIG. 1, in accordance with various embodiments.

FIG. 14 illustrates an embodiment of the system 100 in which the slave node 104 may have its own source of local power (indicated by its associated voltage regulator 111-2 coupled to the power supply 119). A switch 113 coupled to an output pin of the voltage regulator 111-2 may put a DC voltage on to the bus 106 (through the resistor R5) when the switch 113 is closed, which may then enable the voltage regulator 111-1 (through the resistor R4). The output of the voltage regulator 111-1 may be coupled to the enable input of the voltage regulator 111-1 through a resistor R1; this loop may maintain the voltage regulator 111-1 in an enabled mode if the switch 113 at the slave node 104 is a momentary switch (and thus opens shortly after it is initially closed). In some embodiments, the diode coupled between the resistor R4 and the enable input of the voltage regulator 111-1 may not be included, as noted above. The host 110 (which may be or include a microcontroller, as discussed above) may have an I/O pin coupled by a resistor R2 to the enable input of the voltage regulator 111-1; the host 110 may use this I/O pin to disable the voltage regulator 111-1 when the master node 102 is to go into a low power mode. In some embodiments, the I/O pin of the host 110 may sustain the enable input on the voltage regulator 111-1 after the switch 113 initiates the bus enable (e.g., by momentarily closing). An I/O pin of the slave node 104 may be coupled to one side of the switch 113 so as to detect when the switch 113 is closed; in some embodiments, when the slave node 104 detects that the switch 113 has been closed, the slave node 104 may generate an interrupt (e.g., transmitted over I2C). The resistance of the resistor R5 may be selected to provide a high impedance between the slave node 104 and the master node 102, so as to not interfere with line diagnostics that would identify a fault if the bus 106 appeared to be shorted to the voltage regulator 111-2 of the slave node 104. The resistor R5 may act as a current limiting resistor and can be part of a voltage divider with the resistor R6, or the resistor R3. In the system 100 of FIG. 14, the slave node 104 may draw current for the voltage regulator 111-2 and quiescent current for the node transceiver 120-2 when the bus 106 is inactive.

Figure 15:
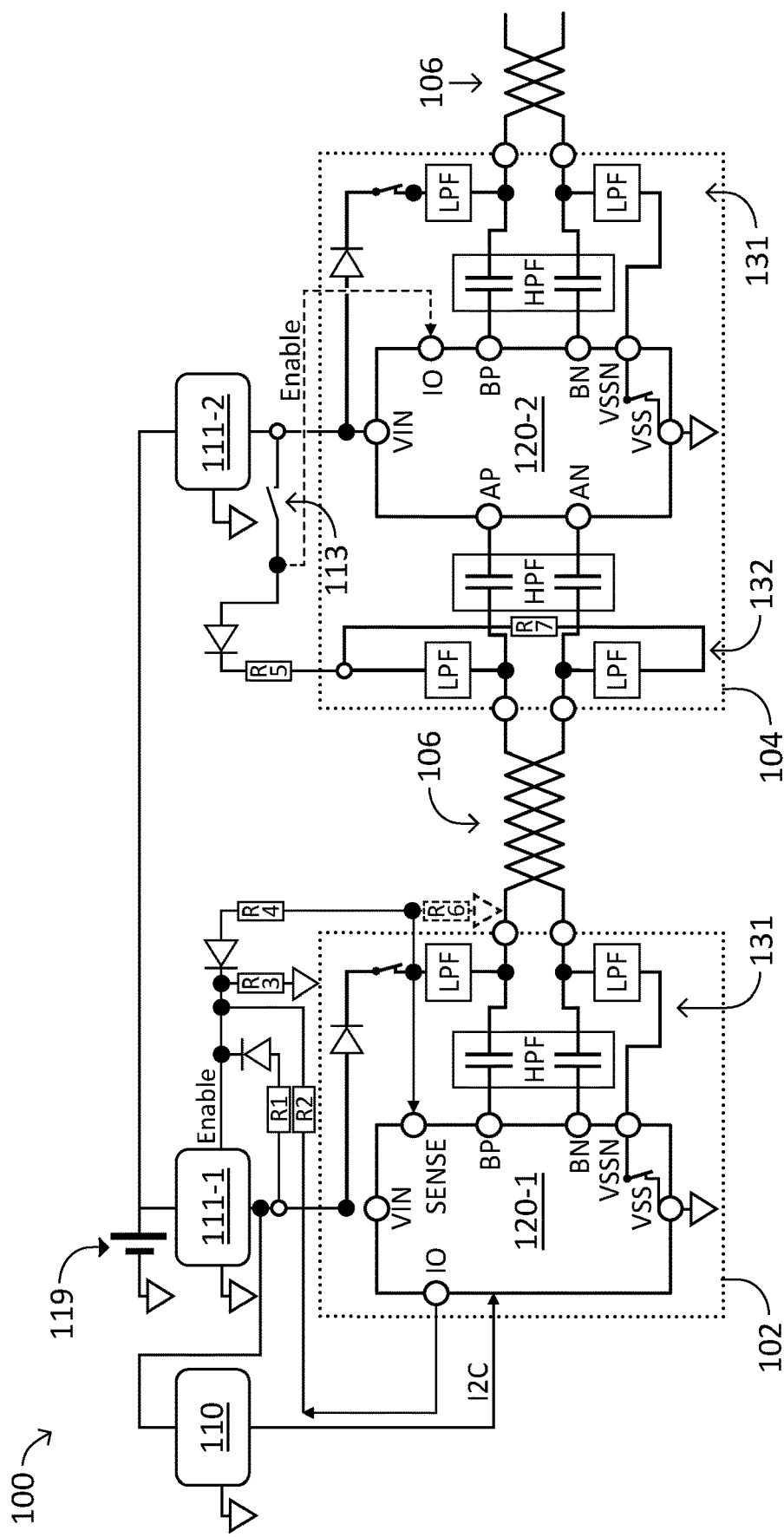

FIG. 15 illustrates an embodiment of the system 100 in which the node transceiver 120-1 itself may have an I/O pin coupled by the resistor R2 to the enable input of the voltage regulator 111-1; the master node 102 may use this I/O pin to disable the voltage regulator 111-1 when the master node 102 is to go into a low power mode. In some embodiments, the I/O pin of the node transceiver 120-1 may sustain the enable input on the voltage regulator 111-1 after the switch 113 initiates the bus enable (e.g., by momentarily closing). Such an embodiment may be particularly suitable, for example, when the host 110 does not have an available I/O pin for disabling the voltage regulator 111-1. In the system 100 of FIG. 15, the slave node 104 may draw current for the voltage regulator 111-2 and quiescent current for the node transceiver 120-2 when the bus 106 is inactive. The voltage regulator 111-2 in the system 100 of FIG. 15 (and other embodiments of the system 100) may be a voltage divider, another voltage limiting circuit, or a direct connection to the power supply 119 (as discussed further below).

Figure 16:
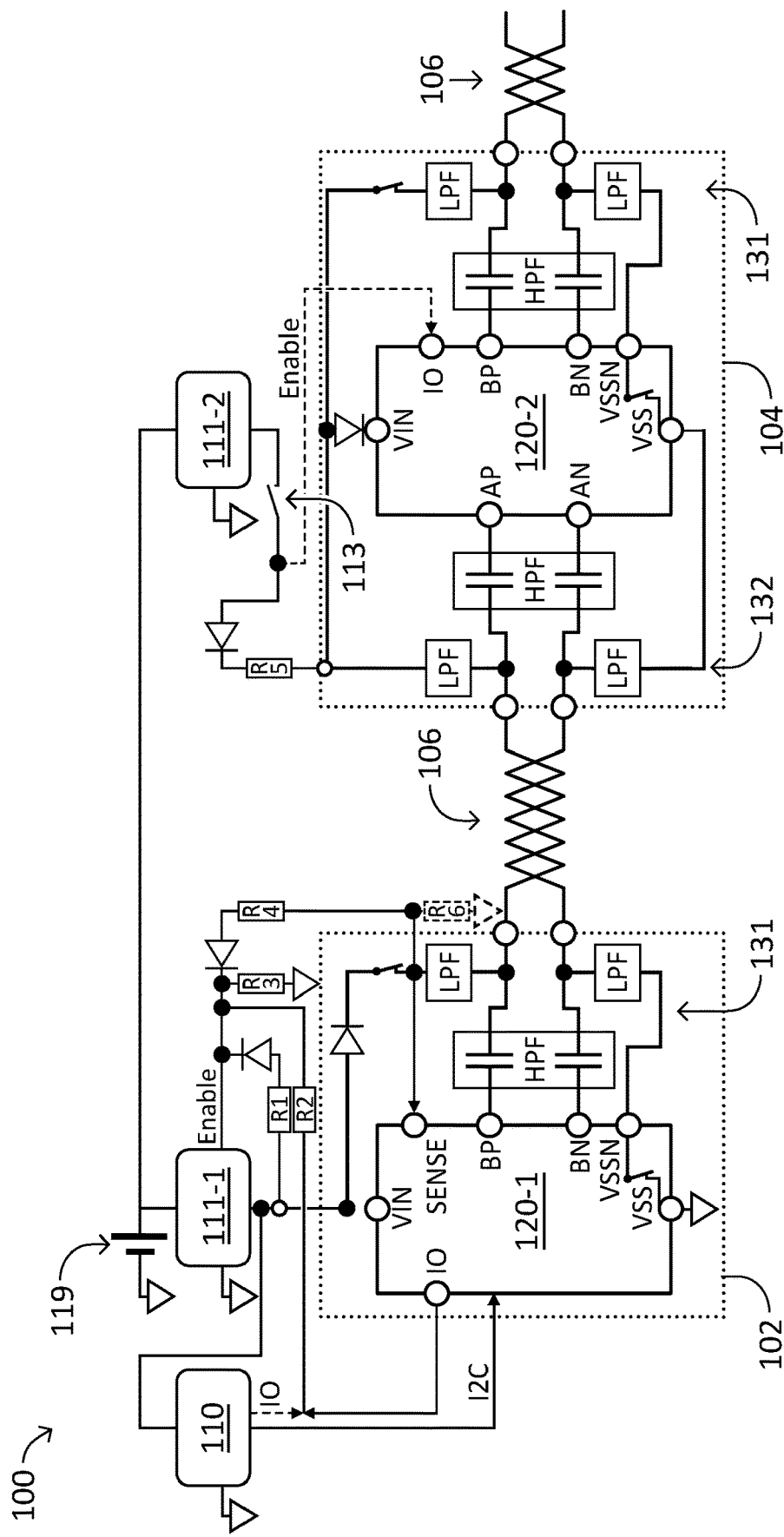

FIG. 16 illustrates an embodiment of the system 100 in which the slave node 104 may be "phantom powered" by the voltage provided over the bus 106 by the master node 102. In particular, as discussed above, the upstream filtering circuitry 132 of the slave node 104 may low-pass filter the signals provided over the bus 106, and may use the low frequency (e.g., DC) components to power the node transceiver 120-2, as shown. The voltage regulator 111-2 associated with the slave node 104, as illustrated in FIG. 16, is an optional component that may be included to allow the slave node 104 to put power on to the bus 106 to perform enable signaling through the switch 113, as discussed above, but may not be used to power the slave node 104 (in contrast to the embodiments of FIGS. 14 and 15). The system 100 of FIG. 16 may include an I/O pin of the host 110 coupled to the enable input of the voltage regulator 111-1 (as discussed above with reference to FIG. 14) or an I/O pin of the node transceiver 120-1 coupled to the enable input of the voltage regulator 111-1 through the resistor R2 (as discussed above with reference to FIG. 15). In the embodiment of FIG. 16 (and FIGS. 17-20), the quiescent current drawn by the node transceiver 120-2 may be limited.

Figure 17:
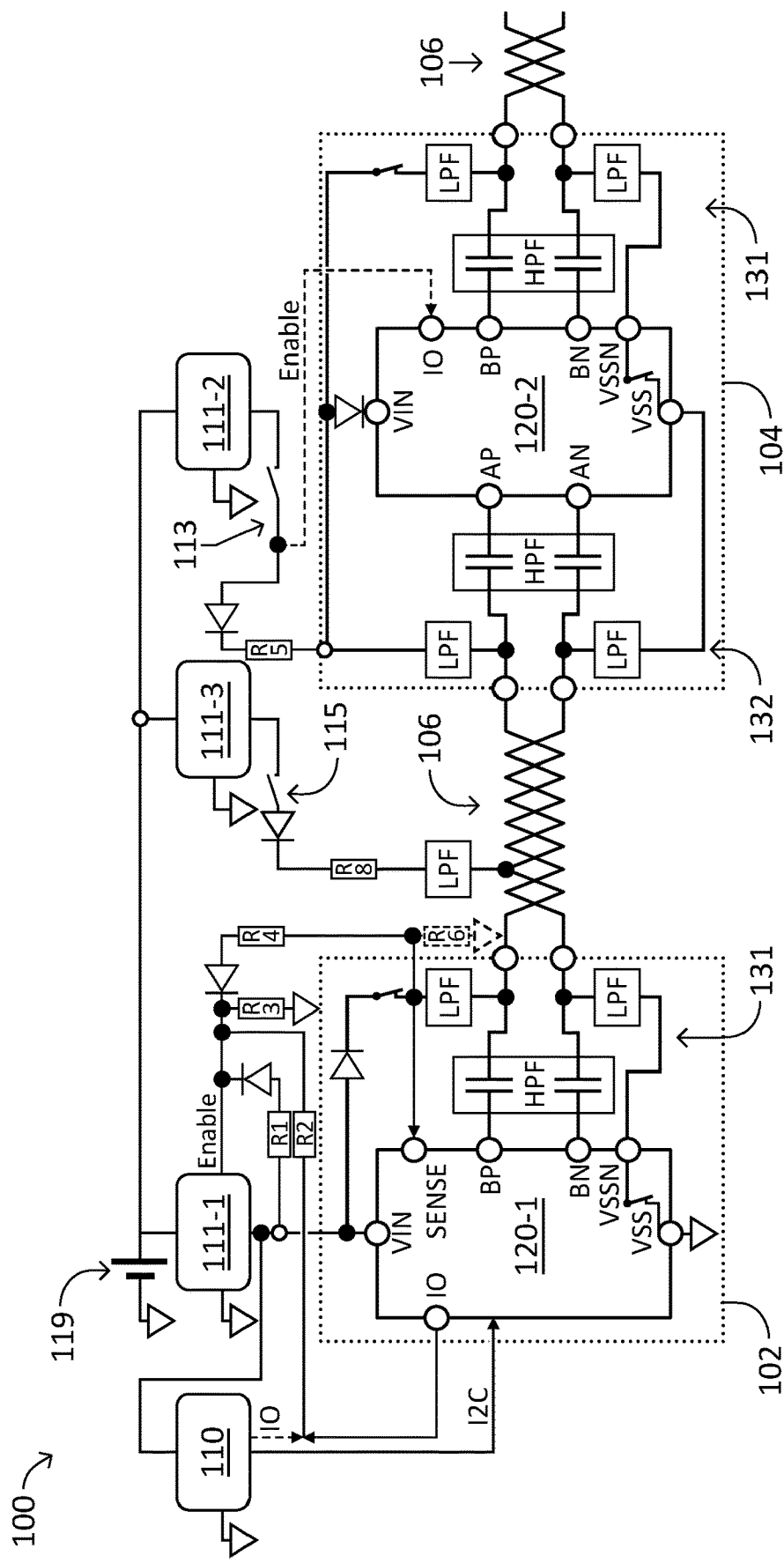

In the embodiment of the system 100 illustrated in FIG. 17, a switch 115 that has its own voltage regulator 111-3 (e.g., a battery) may be coupled to the bus 106 as shown (e.g., through a resistor R8); this switch 115 may be used to enable the master node 102, as discussed above with reference to FIG. 14). In some embodiments, the resistance of the resistor R8 may be equal to the resistance of the resistor R5. FIG. 17 thus illustrates an embodiment in which a non-slave switch like the switch 115 (or another device) may be coupled to the bus 106 and used to enable bus communications. FIG. 17 also illustrates a switch 113, associated with the slave node 104, that may also be used to enable bus communications (e.g., as discussed above with reference to FIG. 14) such that actuation of either switch 115 or switch 113 may enable communications along the bus 106. For example, the slave node 104 may be a microphone device mounted in the ceiling of a vehicle, and the switch 115 may be an emergency roadside assistance button located near the upper light fixture or in the dashboard; communications along the bus 106 may be enabled by pressing the emergency roadside assistance button (associated with switch 115) or issuing a voice command received and interpreted by the slave node 104 (associated with the switch 113). In some embodiments, the switch 113 (and its associated circuitry for enabling the bus 106) may not be included in the system 100 of FIG. 17. In the embodiment of FIG. 17, the slave node 104 is also phantom powered (as discussed above with reference to FIG. 16); the voltage regulator 111-3 and the switch 115 (and their associated circuitry) may also be used in combination with the systems 100 illustrated in FIG. 14 and FIG. 15 (in which the slave node 104 is locally powered).

Figure 18:
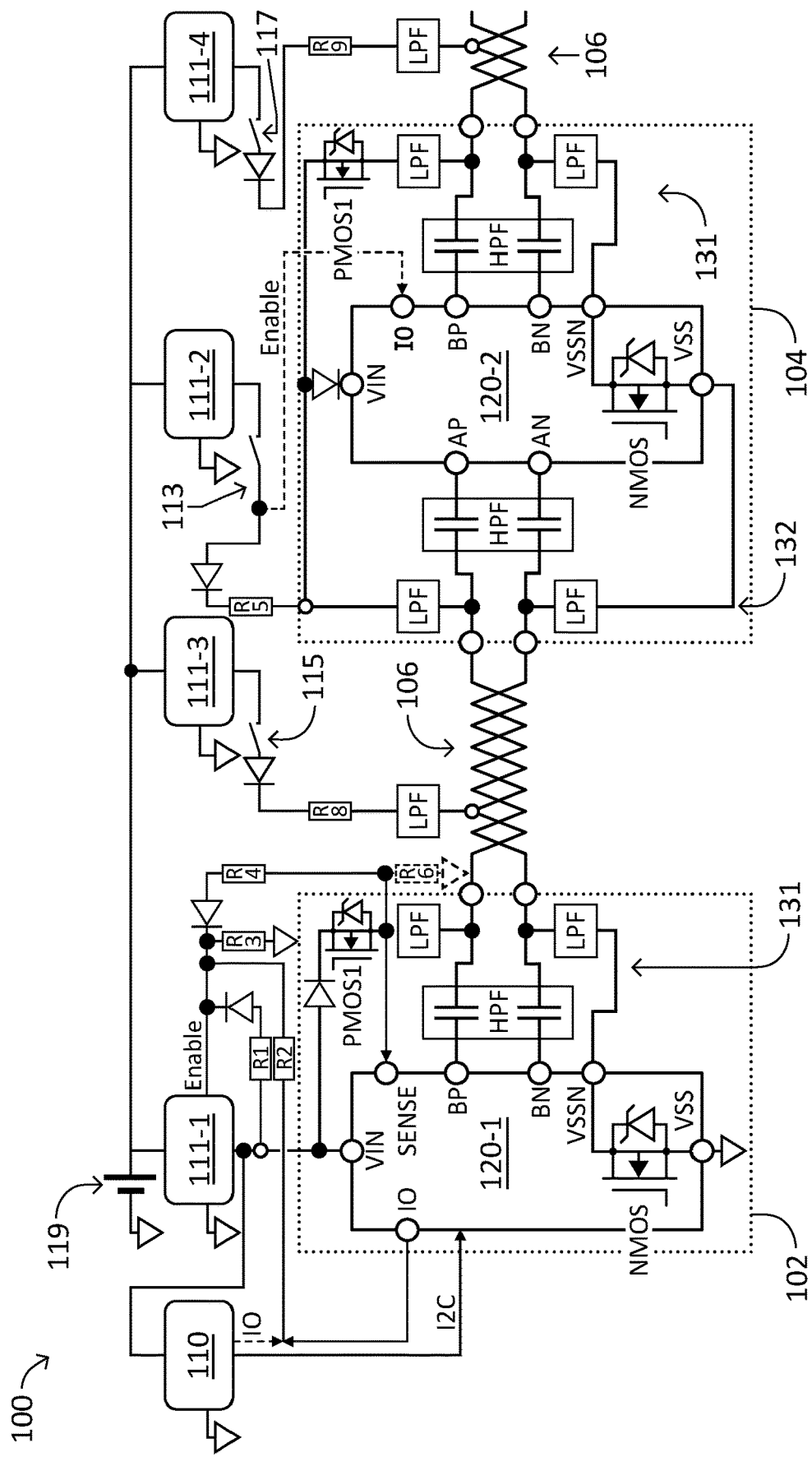

FIG. 18 illustrates an embodiment of the system 100 in which a switch 117 and associated voltage regulator 111-4, located "after" the slave node 104 on the bus 106, may be used to enable the bus 106. In particular, the slave node 104 may be disposed between the point where the switch 117/voltage regulator 111-4 contacts the bus 106 (through a resistor R9) and the master node 102 along the bus 106. In some embodiments, the resistance of the resistor R9 may be equal to the resistance of the resistor R5. FIG. 18 also includes switch 115 and switch 113, as discussed above with reference to FIG. 17; in some embodiments, switch 115 and/or switch 113 (and their associated circuitry for enabling the bus 106) may be omitted from the embodiment of the system 100 of FIG. 18. In FIG. 18, the switches internal to the master node 102 and slave node 104 are shown as NMOS/PMOS FETs; during operation, the voltage put onto the bus 106 by the switch 117 may drop across these internal NMOS/PMOS FETs all the way "back" to the master node 102. In the embodiment of FIG. 18, the slave node 104 is also phantom powered (as discussed above with reference to FIG. 16); the voltage regulator 111-4 and the switch 117 (and their associated circuitry) may also be used in combination with the systems 100 illustrated in FIG. 14 and FIG. 15 (in which the slave node 104 is locally powered). FIG. 18 thus illustrates another embodiment in which a non-slave switch like the switch 117 (or another device) may be coupled to the bus 106 and used to enable bus communications. For example, the slave node 104 may be a microphone device mounted in the ceiling of a vehicle, and the switch 117 may be an emergency roadside assistance button, as discussed above with reference to FIG. 17.

Figure 19:
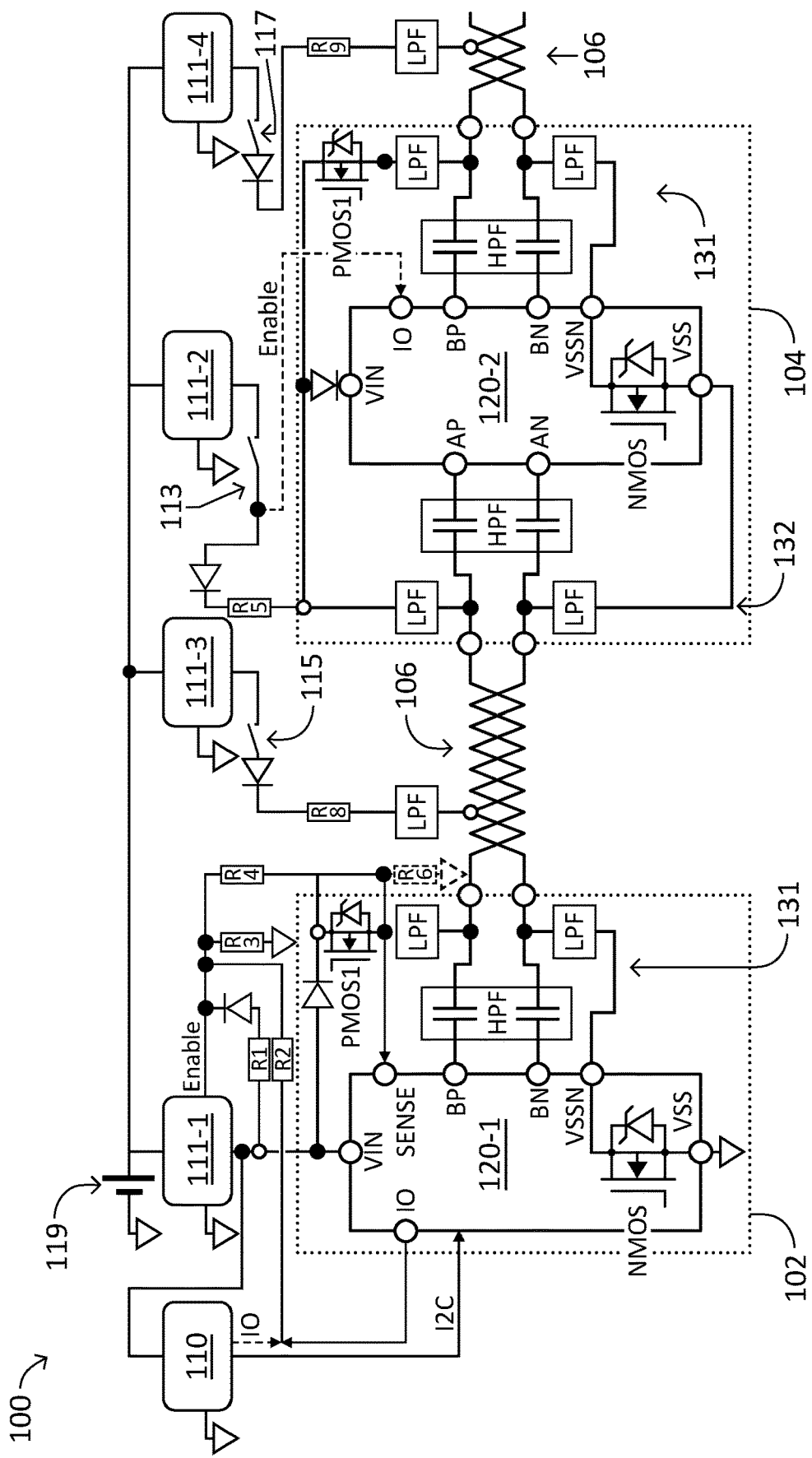

FIG. 19 illustrates an embodiment of the system 100 that shares a number of features with the embodiment illustrated in FIG. 18; however, in FIG. 19, no diode is present between the resistor R4 and the enable input of the voltage regulator 111-1. Sufficient reverse protection may be provided by the PMOS FET (labeled "PMOS1") in the master node 102 (e.g., as illustrated by the diode symbol of PMOS1). In the embodiment of FIG. 19 (and FIG. 20), the resistors R5 and R6 may provide a voltage divider for the voltage at the enable input of the voltage regulator 111-1. One or more of the switches 113, 115, and 117 (and their associated circuitry for enabling the bus 106) may be omitted from the embodiment of FIG. 19, if desired. Similarly, the embodiments of the system 100 illustrated in any of FIGS. 14-28 may be modified by omitting the diode between the resistor R4 and the enable input of the voltage regulator 111-1.

Figure 20:
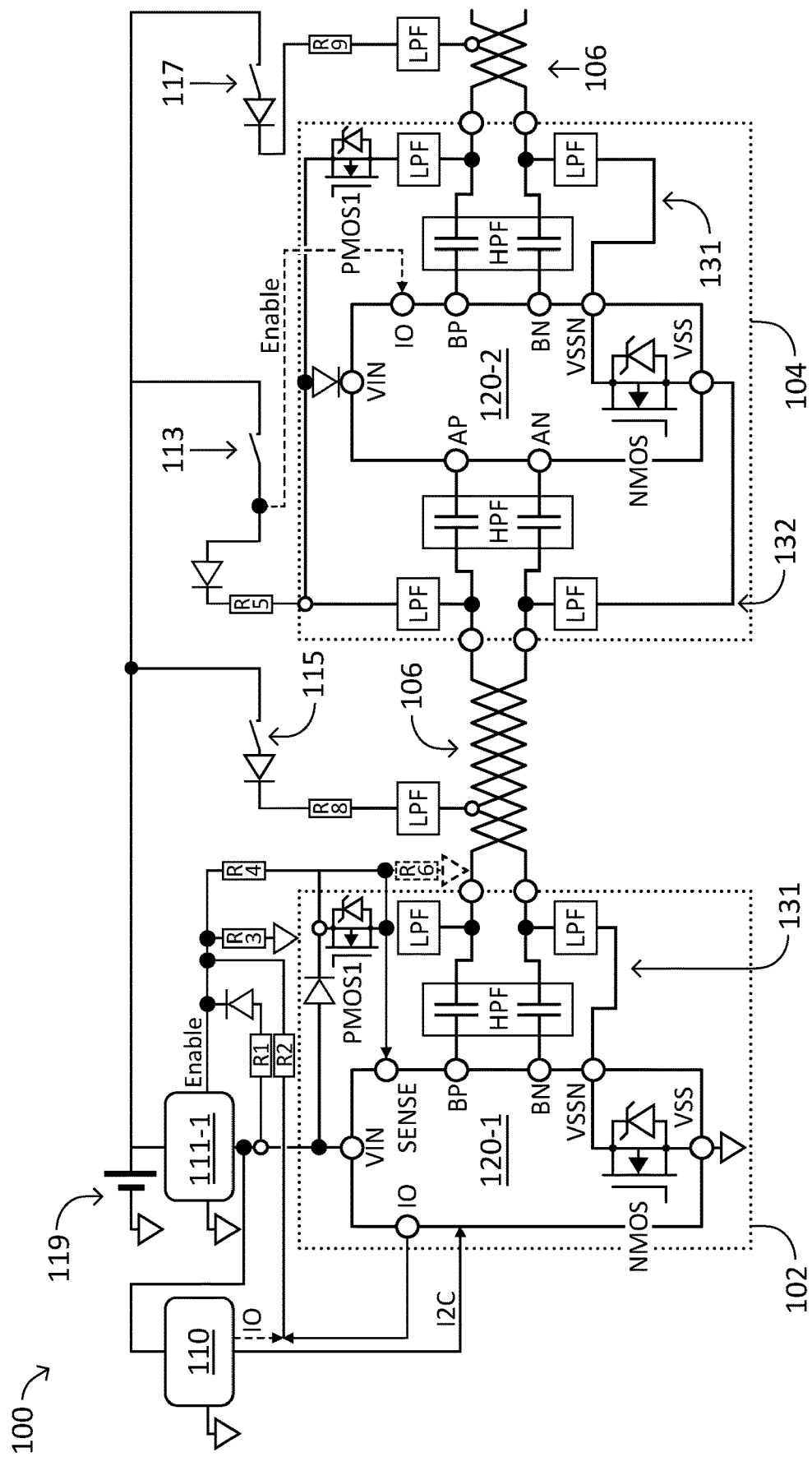

FIG. 20 illustrates an embodiment of the system 100 that shares a number of features with the embodiment illustrated in FIG. 18; however, in FIG. 20, the switches 113, 115, and 117 are coupled to the power supply 119 without any intervening voltage regulators 111-2, 111-3, and 111-4, respectively. In some embodiments, the switches 113, 115, and/or 117 may be coupled directly to the power supply 119, as shown. One or more of the switches 113, 115, and 117 (and their associated circuitry for enabling the bus 106) may be omitted from the embodiment of FIG. 20, if desired. Similarly, the embodiments of the system 100 illustrated in any of FIGS. 14-28 may be modified by omitting the voltage regulators 111 between the power supply 119 and the switches 113, 115, and/or 117 and. In the embodiment of FIG. 20, the slave node 104 is also phantom powered (as discussed above with reference to FIG. 16); the switches 113, 115, and 117 (and their associated circuitry) may also be used in combination with the systems 100 illustrated in FIG. 14 and FIG. 15 (in which the slave node 104 is locally powered).

Figure 21:
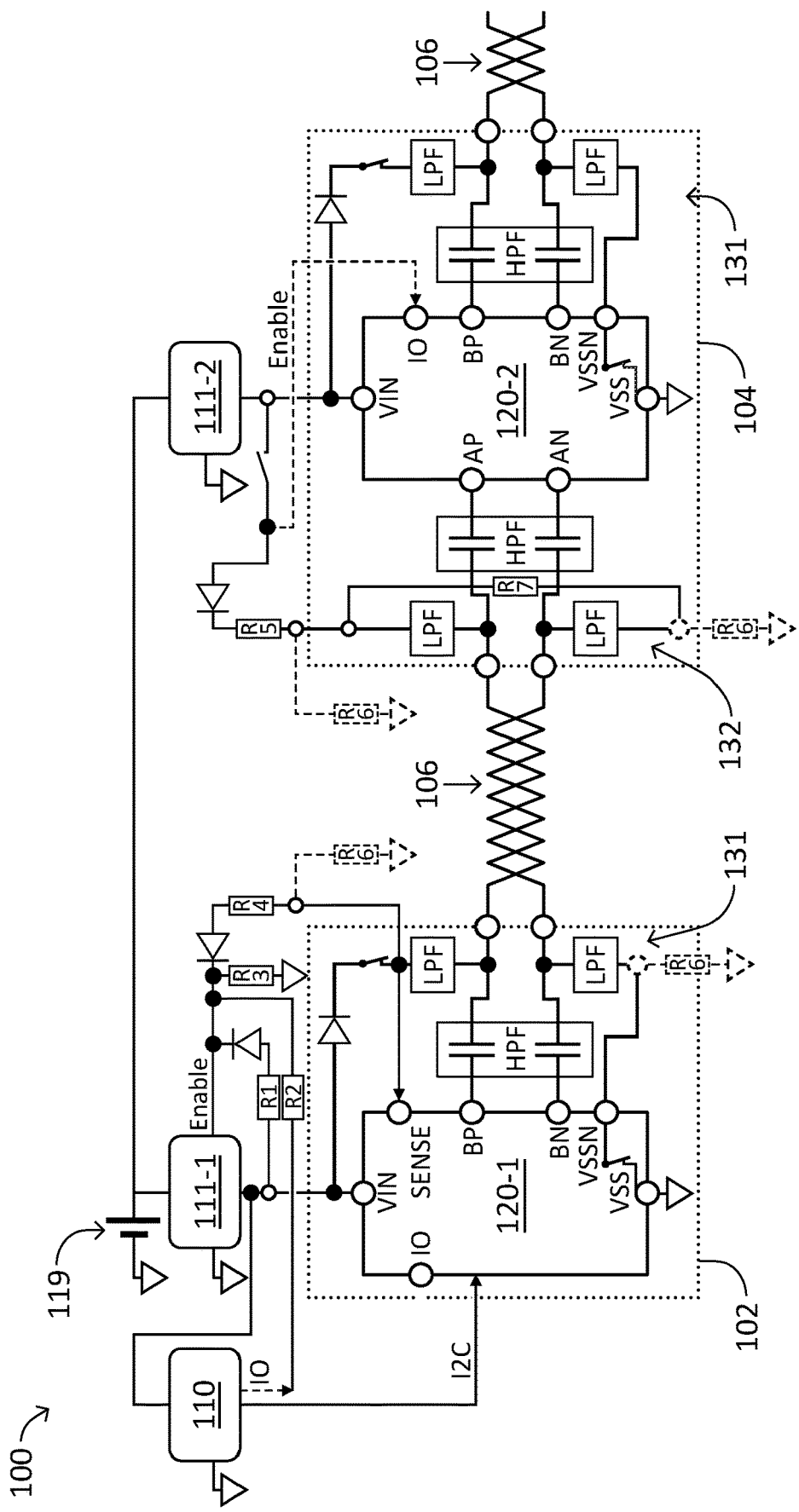

FIGS. 14-20 illustrate a resistor R6 between the resistor R4 and ground. This particular location for the resistor R6 is simply illustrative, and the resistor R6 may be positioned in any of a number of locations in the system 100. FIG. 21 illustrates example locations for the resistor R6 in the context of the system 100 of FIG. 14; the system 100 may include a resistor R6 in any one of these dotted line positions. More generally, any of the positions for the resistor R6 illustrated in FIG. 21 may be used in any of the embodiments disclosed herein. The resistor R6 may, together with one or more other resistors in the system 100, provide a voltage divider for generating the voltage that will be provided to the enable input of the voltage regulator 111-1. The resistor R6 may not be included in some embodiments. The resistor R7 may be similarly repositioned, in some embodiments.

When a power supply (e.g., a voltage regulator) local to a switch provides the power (e.g., voltage) used to initiate the enabling of the bus 106 by actuation of the switch (e.g., as discussed above with reference to FIGS. 14-21), an example enable sequence may be as follows. The master node 102 may begin in a low power mode in which its associated voltage regulator 111-1 is disabled. The switch (e.g., the switch 113, 115, or 117 in appropriate embodiments) may be closed, completing a connection to the power supply (e.g., a voltage regulator 111-2, 111-3, 111-4, and/or the power supply 119). The power supply may provide a bias voltage on the bus 106 through the switch (in some embodiments, through a reverse current protection diode and resistor used to provide a high impedance and thus mitigate interference with cable diagnostics). The bias voltage on the bus 106 may be connected to the enable input on the voltage regulator 111-1 "local to" the master node 102 (e.g., through a forward diode and resistor). The voltage regulator 111-1 may thus be initially enabled by the bias voltage on the bus 106 (provided by the power supply), and the voltage regulator 111-1 may be held in the enabled state (e.g., by a feedback loop from the output of the voltage regulator 111-1 to the enable input of the voltage regulator 111-1, as illustrated in various ones of FIGS. 14-28). The node transceiver 120-1 may receive the voltage output from the voltage regulator 111-1 and may power up.

In some embodiments, the host 110 may also be connected to the voltage regulator 111-1; for example, the host 110 may be powered by the voltage regulator 111-1 and may boot up in response to the voltage output from the voltage regulator 111-1). In another example, the host 110 may receive a signal (at an input pin) representative of the enabling of the voltage regulator 111-1 (e.g., the output signal from the voltage regulator 111-1 or the signal at the enable input of the voltage regulator 111-1). This latter embodiment may be particularly appropriate when the host 110 is not powered by the voltage regulator 111-1, but instead has a different power supply. Upon detecting that the master node 102 is powered up, the host 110 may initiate programming of the node transceiver 120-1 and discovery of slave nodes 104 on the bus 106. The node transceiver 120-1 may take over control of the bias on the bus 106 (e.g., via a bus bias switch and line diagnostics functions of the node transceiver 120-1). Upon discovery of a slave node 104, the slave node 104 may monitor the status of an I/O pin that reflects the status of the switch that initiated the bus enable. When the status of this switch changes (e.g., the switch is opened or closed), the slave node 104 may transmit an interrupt to the host 110 or create a GPIO-to-GPIO transfer of this information to the host 110 over the bus 106. The particular status of the switch may determine subsequent events (e.g., the master node 102 may return to its low power mode, the host 110 may perform some predetermined "housekeeping" procedures before disabling the bus 106, etc.). Communications along the bus 106 may be shut down when the I/O pin to the node transceiver 120-1 is pulled low. In some embodiments, a shut down of the power to the node transceiver 120-1 (e.g., from the voltage regulator 111-1) may reset all of the data registers in the node transceiver 120-1.

Figure 22:
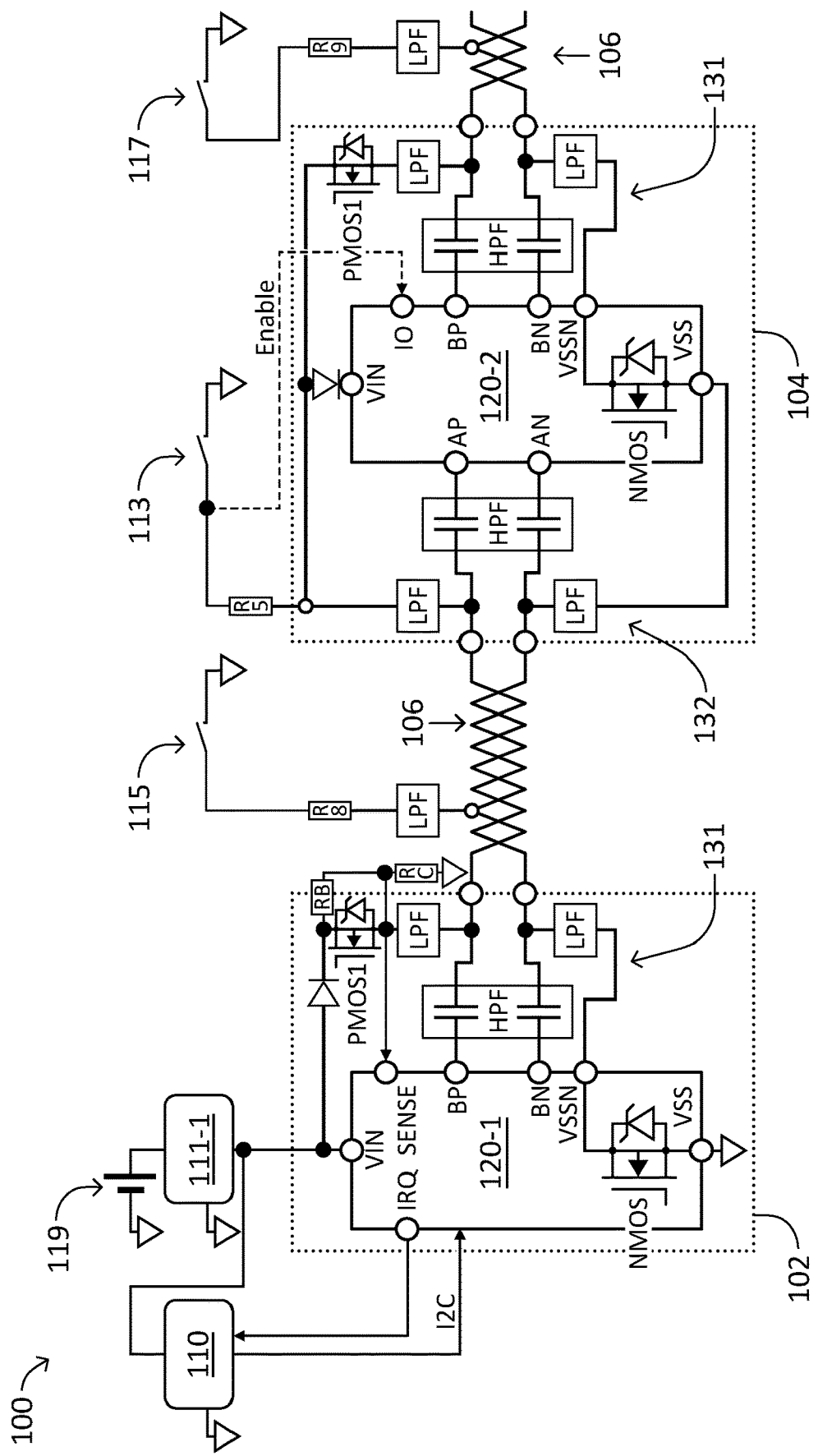
Figure 23:
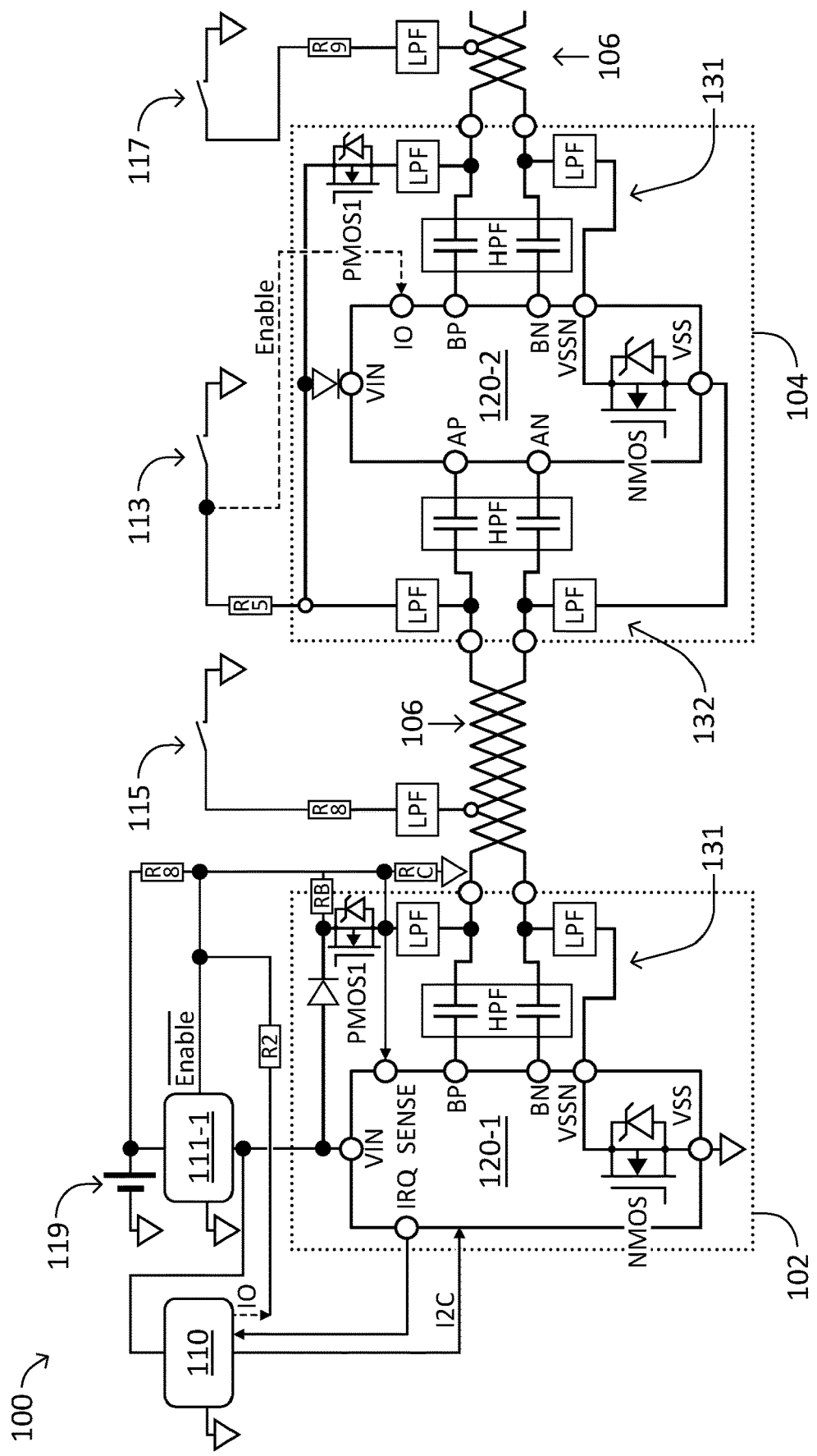

In the embodiments discussed above with reference to FIGS. 14-21, the bus 106 has been enabled by coupling the bus 106 to a non-ground reference voltage. FIG. 22 illustrates an embodiment of the system 100 in which bus communications may be enabled by coupling the bus 106 to ground, rather than to a non-ground reference voltage. In particular, FIG. 22 illustrates an embodiment of the system 100 in which any of three switches 113, 115, and 117 may be closed to momentarily short the bus 106 to ground (through associated resistors R8, R5, and R9, respectively), enabling communications over the bus 106 as discussed above. In FIG. 22 (and FIG. 23), the resistors RB and RC provide a voltage divider to position the off level and the enable input level (e.g., along with the resistor R8). In some embodiments, the resistor RB may be used instead of PMOS1 to provide a weak bias to the bus 106. The resistors RB and RC are optional. In the embodiments of FIGS. 22 and 23, a signal from the I/O pin of the host 110 may be used to disable the voltage regulator 111-1. One or more of the switches 113, 115, and 117 (and their associated circuitry for enabling the bus 106) may be omitted from the embodiment of FIG. 22, if desired. In the embodiment of FIG. 22, the slave node 104 is also phantom powered (as discussed above with reference to FIG. 16); the switches 113, 115, and/or 117 (and their associated circuitry) of the embodiment of FIG. 23 may also be used in combination with the systems 100 illustrated in FIG. 14 and FIG. 15 (in which the slave node 104 is locally powered).

FIG. 23 illustrates an embodiment of the system 100 that shares a number of features with the embodiment illustrated in FIG. 22; however, in FIG. 23, the voltage regulator 111-1 may use a low voltage input to enable operation (rather than a high voltage input). In the embodiment of FIG. 23, the switches 113, 115, and 117 are illustrated as disposed between the bus 106 and ground, as discussed above with reference to FIG. 22; these switches 113, 115, and 117 may thus couple the bus 106 to ground, instead of to a voltage derived from the power supply 119, as illustrated in FIGS. 14-21. One or more of the switches 113, 115, and 117 (and their associated circuitry for enabling the bus 106) may be omitted from the embodiment of FIG. 23, if desired. In the embodiment of FIG. 23, the slave node 104 is also phantom powered (as discussed above with reference to FIG. 16); the switches 113, 115, and/or 117 (and their associated circuitry) of the embodiment of FIG. 23 may also be used in combination with the systems 100 illustrated in FIG. 14 and FIG. 15 (in which the slave node 104 is locally powered).

When actuation of a switch enables the bus 106 by connecting the bus 106 to a local ground (e.g., as discussed above with reference to FIGS. 22-23), an example enable sequence may be as follows. The master node 102 may begin in a low power mode in which its associated voltage regulator 111-1 is disabled. A small amount of power may be used to maintain PMOS1 in an enabled state (while the illustrated NMOS FET is off). The switch (e.g., the switch 113, 115, or 117 in appropriate embodiments) may be closed, shorting the bus 106 to ground. The SENSE pin of the node transceiver 120-1 may sense the voltage drop on the bus 106, and, in response, the node transceiver 120-1 may generate an interrupt request. In response to the interrupt request, the host 110 may cause the master node 102 to power up, and may initiate programming of the node transceiver 120-1 and discovery of slave nodes 104 on the bus 106. The node transceiver 120-1 may take over control of the bias on the bus 106 (e.g., via a bus bias switch and line diagnostics functions of the node transceiver 120-1). Upon discovery of a slave node 104, the slave node 104 may monitor the status of an I/O pin that reflects the status of the switch that initiated the bus enable. When the status of this switch changes (e.g., the switch is opened or closed), the slave node 104 may transmit an interrupt to the host 110 or create a GPIO-to-GPIO transfer of this information to the host 110 over the bus 106. The particular status of the switch may determine subsequent events (e.g., the master node 102 may return to its low power mode, the host 110 may perform some predetermined "housekeeping" procedures before disabling the bus 106, etc.).

Figure 24:
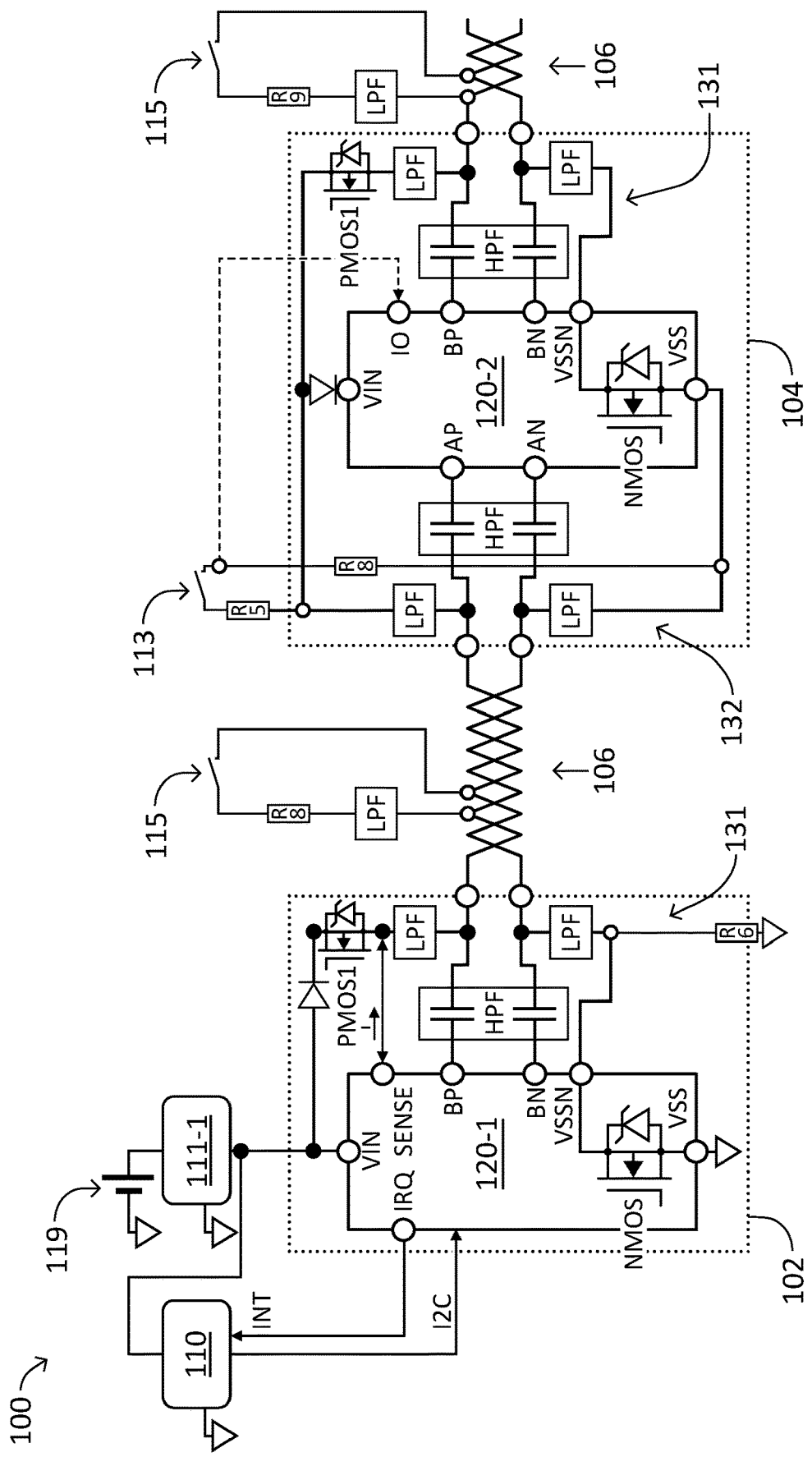

In some embodiments, the phantom power provided by a bus 106 may itself be used to enable communications along the bus 106. FIG. 24 illustrates an embodiment of the system 100 in which the slave node 104 may be phantom powered, and the phantom power itself may be used to initiate a bus enable. In particular, when the switch 113 is closed, the bus 106 may be weakly shorted. The master node 102 may provide a small bias to the bus 106 during its low power mode, as discussed further below (though no communication may take place over the bus 106), and this small bias may be used to send the "wake up" signal back to the master node 102. In some embodiments, a slave node 104 further down the bus 106 (not shown) may sense a remote bus enable when its upstream circuitry is configured to do so. One or more of the switches 113, 115, and 117 (and their associated circuitry for enabling the bus 106) may be omitted from the embodiment of FIG. 24, if desired. In the embodiment of FIG. 24 (and FIGS. 25-26), the resistor R6 may be provided by the on resistance of the NMOS FET, or another internal resistor. In contrast to the embodiment illustrated in FIG. 17, for example, no separate voltage regulators 111 may be associated with the switches 113, 115, or 117.

Figure 25:
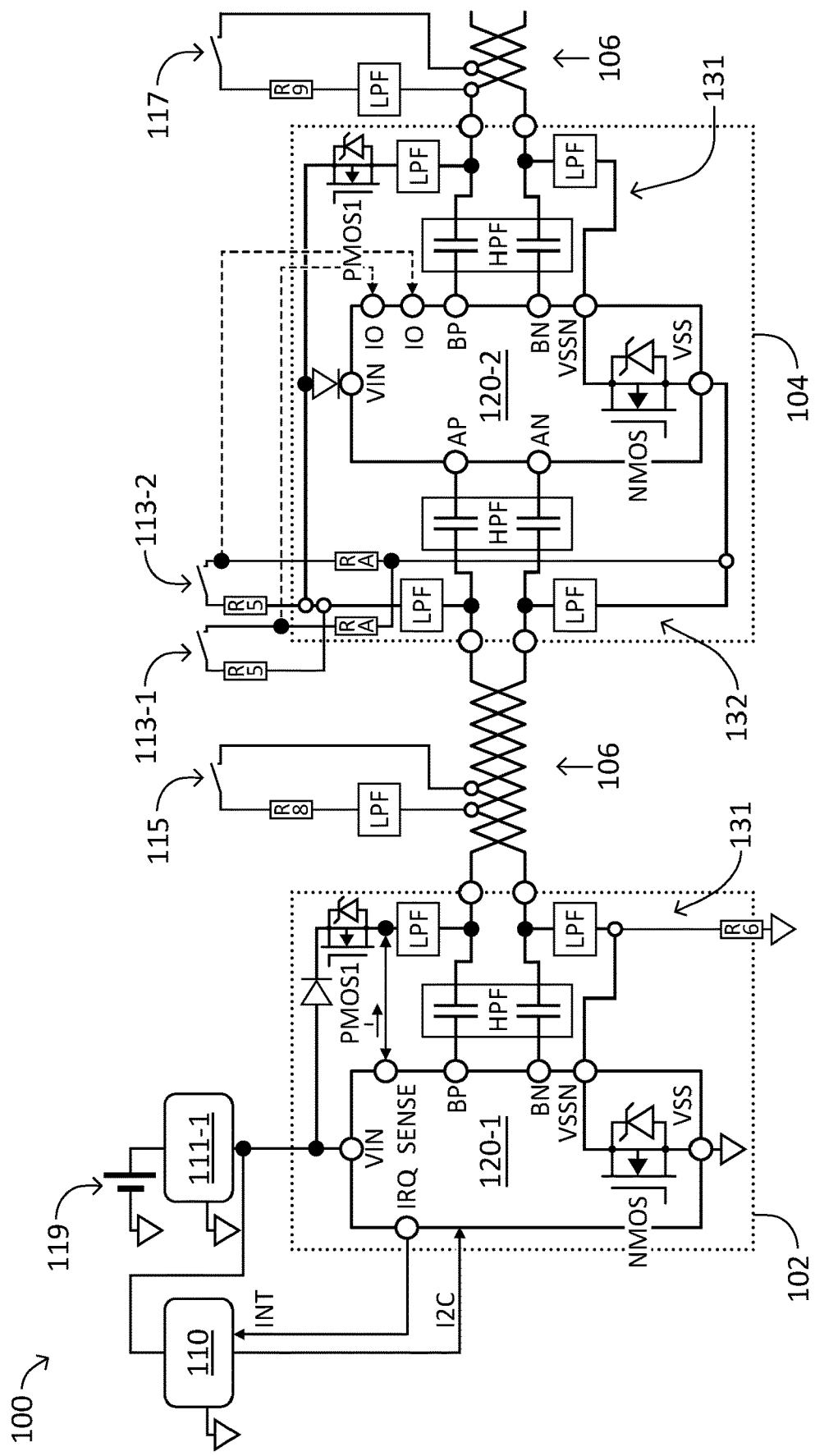

Switches may be included in any of the embodiments disclosed herein to achieve any desired logic function. For example, FIG. 25 illustrates an embodiment of the system 100 in which four switches 113-1, 113-2, 115, and 117 are included (along with additional resistors RA). Switches 113-1 and 113-2 are arranged so that closure of switch 113-1 or switch 113-2 may enable the bus 106. In some embodiments, switches 113-1 and 113-2 (or any other number and arrangement of switches) may be routed to unique I/O pins of the node transceiver 120-2 that can trigger different events during operation. In some embodiments, the two resistors labeled R5 in FIG. 25 may have the same resistances. Any number of switches, in any desired arrangement, may be used with any of the embodiments disclosed herein. One or more of the switches 113, 115, and 117 (and their associated circuitry for enabling the bus 106) may be omitted from the embodiment of FIG. 25, if desired. In the embodiment of FIG. 25, the slave node 104 is also phantom powered (as discussed above with reference to FIG. 16); the switches 113-1, 113-2, 115, and/or 117 (and their associated circuitry) of the embodiment of FIG. 25 may also be used in combination with the systems 100 illustrated in FIG. 14 and FIG. 15 (in which the slave node 104 is locally powered).

Figure 26:
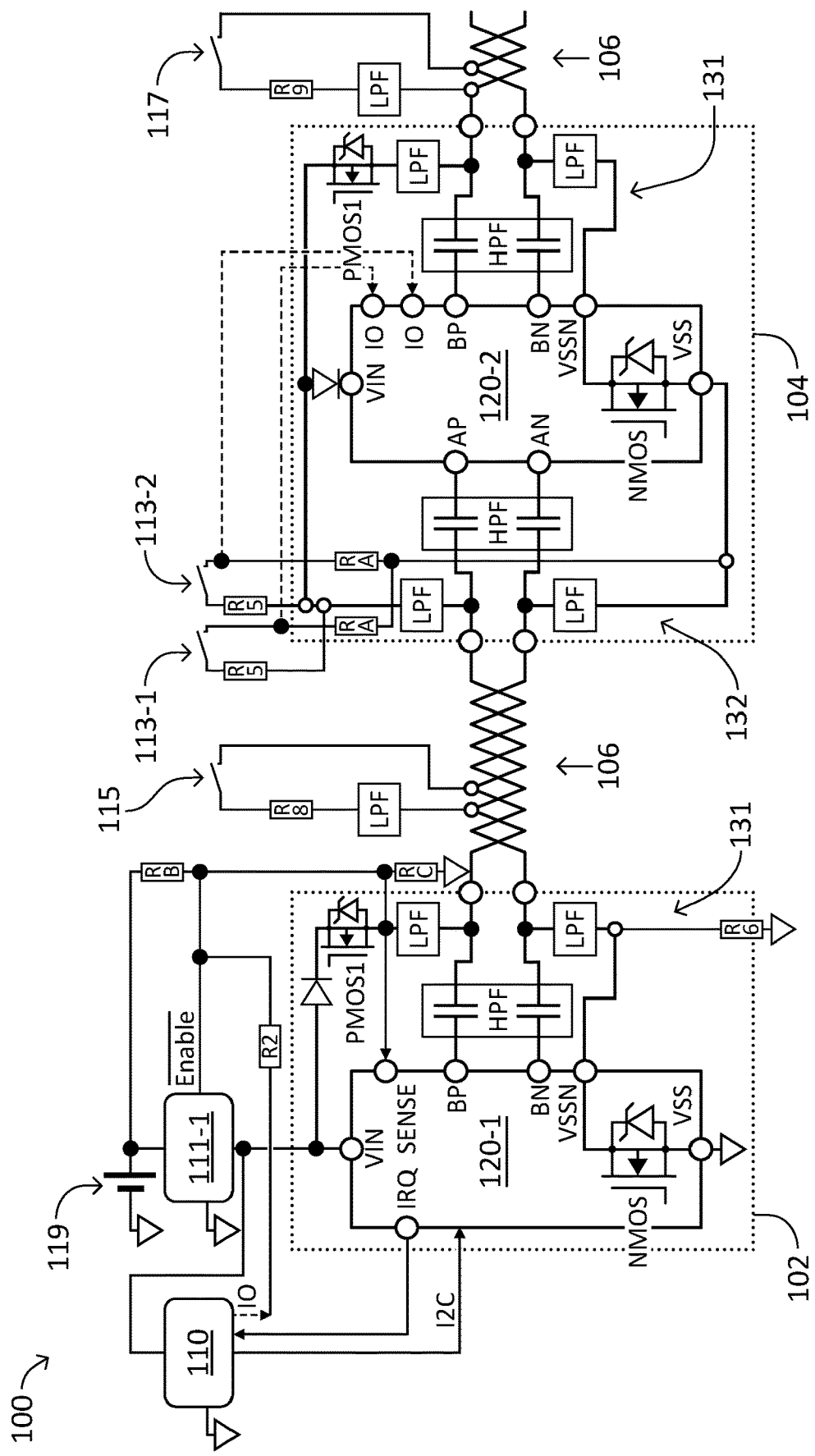

As noted above, the different features illustrated in FIGS. 14-25 may be combined as suitable in additional embodiments of the system 100 with remote bus enable functionality. For example, FIG. 26 illustrates an embodiment of the system 100 including the arrangement of the switches 113-1, 113-2, 115, and 117 of FIG. 25 and the "active low" arrangement around the voltage regulator 111-1 of FIG. 23. In the embodiment of FIG. 26, an NMOS FET internal to or external from the node transceiver 120-1 may be controlled so as to switch on during the low power mode of the master node 102, and switch off prior to line diagnostics and discovery. The value of the resistor RC and/or the resistor R6 may be selected to set a voltage at the node transceiver 120-1 properly.

When the bias on the bus 106 is itself used for remote bus enable (e.g., as discussed above with reference to FIGS. 24-26), an example enable sequence may be as follows. The host 110 may be in a low power mode. The master node 102 may be in a low power mode in which the master node 102 supplies a bias voltage to the bus 106 (e.g., by controlling the PMOS1 or the SENSE pin), and measures the voltage on the VSSN pin. The voltage on the VSSN pin may be low when none of the remote enable switches are engaged. In some embodiments, instead of measuring the voltage on the VSSN pin, the master node 102 may measure the voltage change at the SENSE pin, or may measure the current on the bus 106 (e.g., at the VSSN or SENSE pins). When communication on the bus 106 is not enabled, the current on the bus 106 may be low (equal, e.g., to the quiescent current drawn by the slave node(s) 104). The switch (e.g., the switch 113, 115, or 117 in appropriate embodiments) may be closed, bridging the wires on either side through high impedance resistors (R5, R8, and R9, respectively) and increasing the current flow in the bus 106 to a predictable value (which may be selected to be different from other current levels that are sensed during line diagnostics). The voltage at the VSSN pin of the node transceiver 120-1 may also increase. The node transceiver 120-1 may sense this change in current or voltage, and may signal the event to the host 110 (e.g., with an interrupt request sent over an IRQ pin to the host 110). The host 110 may react by initiating programming of the node transceiver 120-1 and discovery of slave nodes 104 on the bus 106. The node transceiver 120-1 may take over control of the bias on the bus 106 (e.g., via a bus bias switch and line diagnostics functions of the node transceiver 120-1). Upon discovery of a slave node 104, the slave node 104 may monitor the status of an I/O pin that reflects the status of the switch that initiated the bus enable. When the status of this switch changes (e.g., the switch is opened or closed), the slave node 104 may transmit an interrupt to the host 110 or create a GPIO-to-GPIO transfer of this information to the host 110 over the bus 106. The particular status of the switch may determine subsequent events (e.g., the master node 102 may return to its low power mode, the host 110 may perform some predetermined "housekeeping" procedures before disabling the bus 106, etc.).

A "phantom powered enable" system (like those illustrated in FIGS. 24-26) may be particularly advantageous when the switch is "close" to the master node 102 (e.g., next in line along the bus 106, or between the first two slave nodes 104 on the bus 106). When the switch is "further" down the bus 106, additional components may be included in the system 100 so that the actuation of the switch is detectable at the master node 102.

Figure 27:
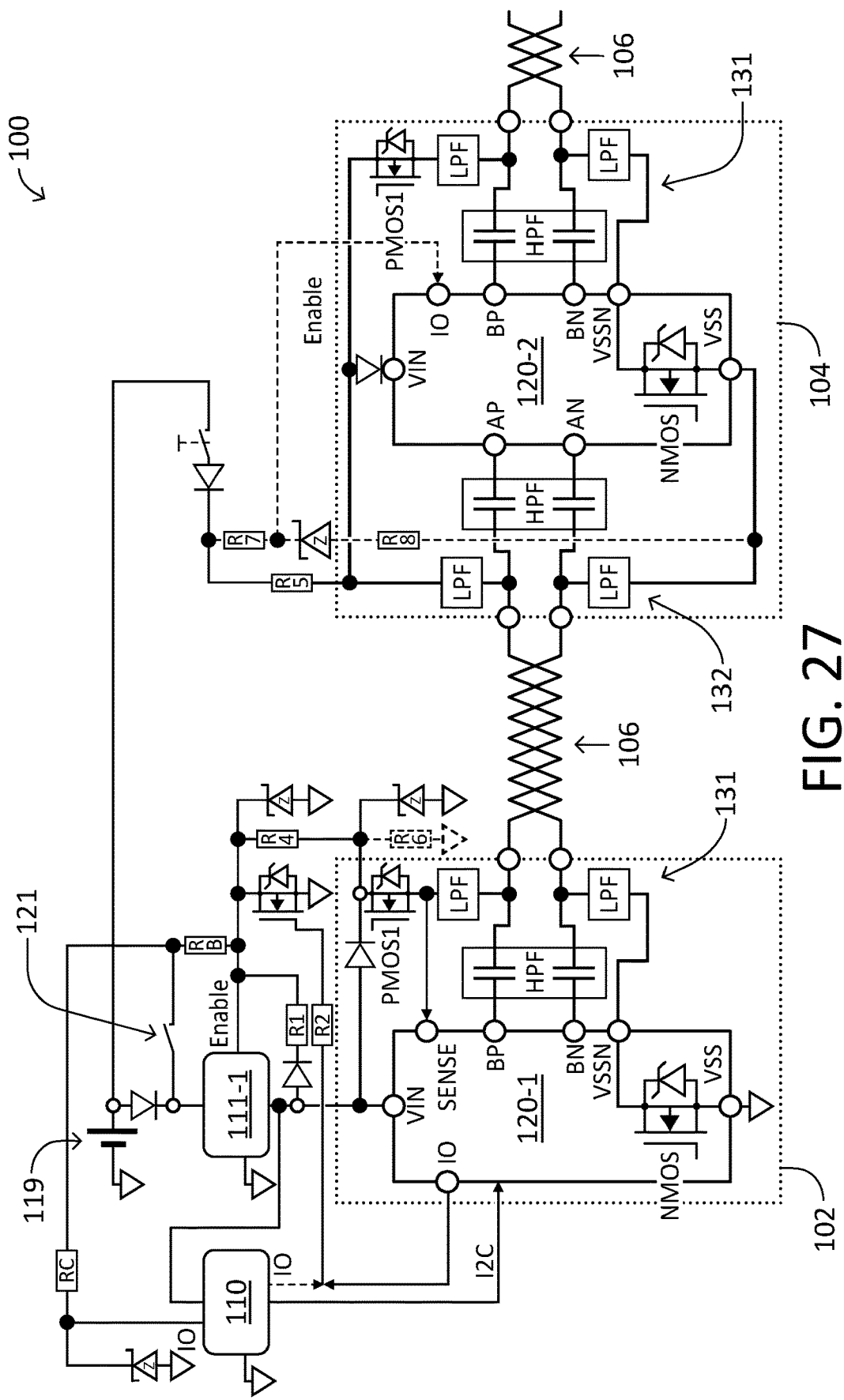

As noted above, any arrangement of switches may be used in any of the embodiments disclosed herein to achieve remote bus enable functionality. For example, FIG. 27 illustrates an embodiment of the system 100 in which the bus 106 may be enabled by a switch 121 coupled between the power supply 119 (e.g., a system battery) and the enable input of the voltage regulator 111-1. The switch 121 may be used in conjunction with, or instead of, any of the arrangements of the switches 113, 115, and/or 117 disclosed herein. In the embodiment of FIG. 27, the slave node 104 is also phantom powered (as discussed above with reference to FIG. 16); the switch 121 (and its associated circuitry) may also be used in combination with the systems 100 illustrated in FIG. 14 and FIG. 15 (in which the slave node 104 is locally powered).

Figure 28:
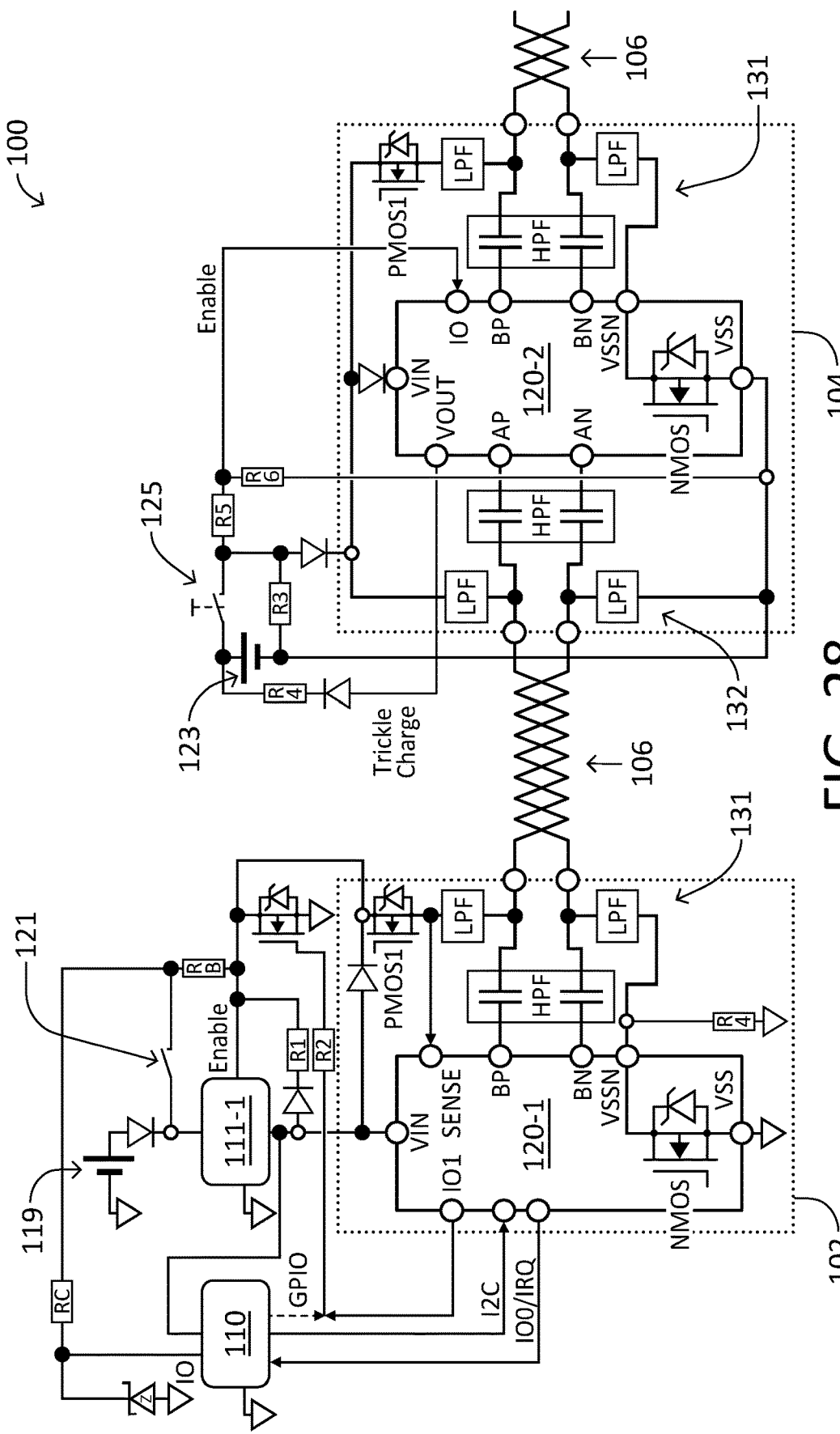

FIG. 28 illustrates an embodiment of the system 100 that shares a number of features with the embodiment illustrated in FIG. 27; however, in FIG. 28, the bus 106 may be enabled by one or more switches 125 coupled to one or more local batteries 123. In some embodiments, the system 100 of FIG. 28 may draw less current while the bus 106 is disabled than the embodiments of FIGS. 24-26. In some embodiments, the batteries 123 may be trickle charged during normal active operation of the system 100 by a voltage regulator (not shown) in the node transceiver 120-2 (whose output is provided by the VOUT pin illustrated in FIG. 28). The switch 125 may be used in conjunction with, or instead of, any of the arrangements of the switches 113, 115, 117, and/or 121 disclosed herein. In the embodiment of FIG. 28, the slave node 104 is also phantom powered (as discussed above with reference to FIG. 16); the switch 125 (and its associated circuitry) may also be used in combination with the systems 100 illustrated in FIG. 14 and FIG. 15 (in which the slave node 104 is locally powered).

The following paragraphs provide examples of various ones of the embodiments disclosed herein.

Example 1 is a communication system with remote enable functionality, including: a master transceiver coupled to a downstream link of a bus; a voltage regulator, wherein the voltage regulator has a voltage output and an enable input, and the voltage output is coupled to the master transceiver; and a switch coupled to the enable input of the voltage regulator.

Example 2 may include the subject matter of Example 1, and may further include a slave transceiver coupled to the downstream link of the bus.

Example 3 may include the subject matter of Example 2, and may further specify that the voltage regulator is a first voltage regulator, and the switch is coupled between the downstream link of the bus and a second voltage regulator associated with the slave transceiver.

Example 4 may include the subject matter of Example 3, and may further specify that the second voltage regulator is to provide power to the slave transceiver.

Example 5 may include the subject matter of Example 3, and may further specify that the second voltage regulator is not to provide power to the slave transceiver.

Example 6 may include the subject matter of any of Examples 2-5, and may further specify that: the downstream link of the bus is a first downstream link of the bus; the voltage regulator is a first voltage regulator; the communication system further includes a second voltage regulator; the communication system further includes a second downstream link of the bus that is downstream of the slave transceiver; and the switch is coupled between the second downstream link of the bus and the second voltage regulator.

Example 7 may include the subject matter of any of Examples 1-6, and may further specify that the voltage regulator is a first voltage regulator, and the communication system further includes a second voltage regulator, wherein the switch is coupled between the downstream link of the bus and the second voltage regulator.

Example 8 may include the subject matter of any of Examples 1-7, and may further include: downstream filtering circuitry between the master transceiver and the downstream link of the bus; and a diode between the downstream filtering circuitry and the enable input of the voltage regulator.

Example 9 may include the subject matter of Example 8, and may further specify that the diode is provided by a PMOS field effect transistor.

Example 10 may include the subject matter of any of Examples 1-9, and may further include a power supply, wherein an output of the power supply is coupled to the voltage regulator, and the switch is coupled between the output of the power supply and the downstream link of the bus.

Example 11 may include the subject matter of Example 10, and may further specify that the switch is coupled directly to the output of the power supply.

Example 12 may include the subject matter of any of Examples 1-11, and may further specify that the switch is coupled between ground and the downstream link of the bus.

Example 13 may include the subject matter of any of Examples 1-12, and may further specify that the downstream link of the bus includes two wires, and the switch is coupled between the two wires.

Example 14 may include the subject matter of any of Examples 1-13, and may further specify that the switch is a first switch, and the communication system further includes a second switch coupled to the enable input of the voltage regulator.

Example 15 may include the subject matter of any of Examples 1-14, and may further include a rechargeable battery, wherein the rechargeable battery is coupled between the switch and the downstream link of the bus.

Example 16 may include the subject matter of any of Examples 1-15, and may further include a host coupled to the master transceiver, wherein the host has an output coupled to the enable input of the voltage regulator.

Example 17 may include the subject matter of Example 16, and may further specify that the host is coupled to the master transceiver via an Inter-Integrated Circuit (I2C) protocol.

Example 18 may include the subject matter of any of Examples 1-17, and may further specify that the master transceiver has an output coupled to the enable input of the voltage regulator.

Example 19 may include the subject matter of any of Examples 1-18, and may further specify that the bus is a two-wire bus, and the master transceiver is to: periodically transmit a synchronization control frame on the downstream link of the bus; and receive a synchronization response frame from the downstream link of the bus, wherein the synchronization response frame originates at a last downstream device on the bus.

Example 20 is a communication system with remote enable functionality, including: a master transceiver coupled to a downstream link of a bus; and a switch coupled between the downstream link of the bus and ground.

Example 21 may include the subject matter of Example 20, and may further include a host coupled to the master transceiver, wherein the master transceiver is to detect a short between the downstream link of the bus and ground, and in response to detection of the short, send an interrupt to the host.

Example 22 may include the subject matter of Example 21, and may further specify that the host is to initialize the master transceiver in response to receipt of the interrupt.

Example 23 is a method of operating a communication system including remote enable functionality, including: entering, by a master transceiver in the communication system, a low power mode, wherein the communication system includes a two-wire communication bus, and the master transceiver is to periodically transmit a synchronization control frame downstream on the two-wire communication bus; detecting, in the communication system, a signal representative of an actuation of a switch, wherein the switch is remote from the master transceiver; and in response to detection of the signal, causing the master transceiver to exit the low power mode.

Example 24 may include the subject matter of Example 23, and may further specify that the switch is associated with an emergency button.

Example 25 may include the subject matter of any of Examples 23-24, and may further specify that the communication system is included in a vehicle.

Example 26 is a communication system with remote bus enable functionality, in accordance with any of the embodiments disclosed herein.

Example 27 is a method of remotely enabling a communication bus, in accordance with any of the embodiments disclosed herein.

Example 28 is circuitry coupled to a master device to provide remote enabling of the master device, in accordance with any of the embodiments disclosed herein.

Example 29 is circuitry coupled to a slave device to provide remote enabling of a communication bus to which the slave device is coupled, in accordance with any of the embodiments disclosed herein.

Example 30 is circuitry coupled to a bus to provide remote enabling of a communication bus between a master device and a slave device that are each different from the circuitry.

Example 31 is circuitry coupled to a bus to provide remote enabling of a communication bus between a master device and a slave device, wherein the slave device is coupled between the master device and the circuitry along the communication bus.

Example 32 is a communication system including means for remote bus enable functionality, in accordance with any of the embodiments disclosed herein.

Example 33 is a communication system including means for performing any of the methods disclosed herein.

The invention claimed is:

1. A communication system, comprising:
    a master transceiver coupled to a downstream link of a two-wire bus, wherein the master transceiver is to periodically transmit a synchronization control frame on the downstream link of the two-wire bus;
    a voltage regulator having a voltage output and an enable input, the voltage regulator being coupled to the master transceiver via the voltage output, wherein the enable input enables operation of the voltage regulator in response to a defined voltage at the enable input; and
    a switch coupled to the enable input of the voltage regulator.

2. The communication system of claim 1, further comprising:
    a slave transceiver coupled to the downstream link of the two-wire bus.

3. The communication system of claim 2, wherein the switch is coupled between the downstream link of the two-wire bus and a second voltage regulator associated with the slave transceiver.

4. The communication system of claim 3, wherein the second voltage regulator is to provide power to the slave transceiver.

5. The communication system of claim 3, wherein the second voltage regulator is not to provide power to the slave transceiver.

6. The communication system of claim 2, further comprising:
    a second voltage regulator; and
    a second downstream link of the two-wire bus that is downstream of the slave transceiver;
    wherein the switch is coupled between the second downstream link of the two-wire bus and the second voltage regulator.

7. The communication system of claim 1, further comprising:
- a second voltage regulator, wherein the switch is coupled between the downstream link of the two-wire bus and the second voltage regulator.

8. The communication system of claim 1, further comprising:
- downstream filtering circuitry between the master transceiver and the downstream link of the two-wire bus; and
- a diode between the downstream filtering circuitry and the enable input of the voltage regulator.

9. The communication system of claim 8, wherein the diode is provided by a PMOS field effect transistor.

10. The communication system of claim 1, further comprising:
- a power supply;
- wherein an output of the power supply is coupled to the voltage regulator, and the switch is coupled between the output of the power supply and the downstream link of the two-wire bus.

11. The communication system of claim 10, wherein the switch is coupled directly to the output of the power supply.

12. The communication system of claim 1, wherein the switch is coupled between ground and the downstream link of the two-wire bus.

13. The communication system of claim 1, wherein the downstream link of the two-wire bus includes two wires, and the switch is coupled between the two wires.

14. The communication system of claim 1, further comprising:
- a second switch coupled to the enable input of the voltage regulator.

15. The communication system of claim 1, further comprising:
- a rechargeable battery;
- wherein the rechargeable battery is coupled between the switch and the downstream link of the two-wire bus.

16. The communication system of claim 1, further comprising:
- a host coupled to the master transceiver, wherein the host has an output coupled to the enable input of the voltage regulator.

17. The communication system of claim 16, wherein the host is coupled to the master transceiver via an Inter-Integrated Circuit (I2C) protocol.

18. The communication system of claim 1, wherein the master transceiver has an output coupled to the enable input of the voltage regulator.

19. The communication system of claim 1, wherein the master transceiver is further to
- receive a synchronization response frame from the downstream link of the two-wire bus, wherein the synchronization response frame originates at a last downstream device on the two-wire bus.

20. A communication system, comprising:
- a master transceiver coupled to a downstream link of a two-wire bus, wherein the master transceiver is to periodically transmit a synchronization control frame on the downstream link of the two-wire bus; and
- a switch coupled between the downstream link of the two-wire bus and ground, wherein the switch is further coupled to an enable input of a voltage regulator, the enable input enabling operation of the voltage regulator in response to a defined voltage at the enable input.

21. The communication system of claim 20, further comprising:
- a host device coupled to the master transceiver;
- wherein the master transceiver is to detect a short between the downstream link of the two-wire bus and ground, and in response to detection of the short, send an interrupt to the host device.

22. The communication system of claim 21, wherein the host device is to initialize the master transceiver in response to receipt of the interrupt.

23. A method, comprising:
- entering, by a master transceiver in a communication system having remote enable functionality, a low power mode, wherein the communication system includes a two-wire communication bus, and the master transceiver is to periodically transmit a synchronization control frame downstream on the two-wire communication bus;
- detecting, in the communication system, a signal representative of an actuation of a switch, wherein the switch is remote from the master transceiver and is coupled to an enable input of a voltage regulator, the enable input enabling operation of the voltage regulator in response to a defined voltage at the enable input; and
- in response to detecting of the signal, causing the master transceiver to exit the low power mode.

24. The method of claim 23, wherein the switch is associated with an emergency button.

25. The method of claim 23, wherein the communication system is included in a vehicle.

26. The communication system of claim 1, wherein the switch is associated with an emergency button.

27. The communication system of claim 1, wherein the communication system is included in a vehicle.

* * * * *